US012260443B2

(12) United States Patent
Arrabothu et al.

(10) Patent No.: US 12,260,443 B2
(45) Date of Patent: Mar. 25, 2025

(54) METHODS AND APPARATUS FOR RECOMMENDING SUBSTITUTIONS

(71) Applicant: Walmart Apollo, LLC, Bentonville, AR (US)

(72) Inventors: Apoorv Reddy Arrabothu, Telangana (IN); Sree Vasthav Shatdarshanam Venkata, Bangalore (IN); Kamiya Motwani, Madhya Pradesh (IN); Kannan Achan, Saratoga, CA (US); Atul Kochhar, San Jose, CA (US); Basant Choudhary, Kolkata (IN); Vidya Sagar Kalidindi, Milpitas, CA (US); Rahul Ramkumar, Santa Clara, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 504 days.

(21) Appl. No.: 17/582,688

(22) Filed: Jan. 24, 2022

(65) Prior Publication Data

US 2023/0237552 A1 Jul. 27, 2023

(51) Int. Cl.
*G06Q 30/00* (2023.01)
*G06Q 10/08* (2023.01)
*G06Q 30/0201* (2023.01)
*G06Q 30/0601* (2023.01)

(52) U.S. Cl.
CPC ......... *G06Q 30/0631* (2013.01); *G06Q 10/08* (2013.01); *G06Q 30/0201* (2013.01); *G06Q 30/0633* (2013.01)

(58) Field of Classification Search
CPC .......... G06Q 30/0631; G06Q 30/0201; G06Q 30/0633; G06Q 30/0641; G06Q 10/08
See application file for complete search history.

(56) References Cited

U.S. PATENT DOCUMENTS

| 11,544,765 B1 * | 1/2023 | Dervidis ............... G06F 3/0484 |
| 2014/0279278 A1 | 9/2014 | Wijaya et al. |
| 2017/0193582 A1 * | 7/2017 | Guo ................... G06Q 30/0633 |
| 2020/0273083 A1 | 8/2020 | Motwani et al. |

(Continued)

OTHER PUBLICATIONS

Ryan, Tom. Can AI solve e-grocery's erratic out-of-stock substitutions? Jun. 28, 2021. Published via RetailWire. Accessed via https://retailwire.com/discussion/can-ai-solve-e-grocerys-erratic-out-of-stock-substitutions/ (Year: 2021).*

(Continued)

*Primary Examiner* — Robert M Pond
(74) *Attorney, Agent, or Firm* — Morgan, Lewis & Bockius LLP; Manita Rawat

(57) ABSTRACT

In some examples, a system may be configured to, implement a first set of operations that generate a first set of data characterizing an importance of the most recently added anchor item to the user. Further, the system may be configured to, implement a second set of operations that generate a second set of data characterizing a likelihood of an occurrence of a substitution rejection event associated with the user. That way, based on the first set of data and the second set of data, the system may be configured to generate output data, and implement a set of notification operations based on the output data.

20 Claims, 8 Drawing Sheets

(56) References Cited

U.S. PATENT DOCUMENTS

2021/0233143 A1 7/2021 Cho et al.
2022/0237530 A1* 7/2022 Franey ................. G06Q 10/047

OTHER PUBLICATIONS

Redman, Russell. Walmart enlists artificial intelligence for online grocery substitutions. Jun. 25, 2021. Published via Supermarket News. Accessed via https://www.supermarketnews.com/technology/walmart-enlists-artificial-intelligence-online-grocery-substitutions (Year: 2021).*

Raluca Budiu, "Online Shopping for Food and Groceries During Covid-19: Workflow Issues Impact the Ecommerce Customer Experience," May 17, 2020, https://www.nngroup.com/articles/food-shopping-covid19/, 26 pages.

* cited by examiner

METHODS AND APPARATUS FOR RECOMMENDING SUBSTITUTIONS

TECHNICAL FIELD

The disclosure relates to methods and apparatuses for recommending substitutions made to ordered items during an order fulfillment process.

BACKGROUND

At least some e-commerce platforms, such as retailer websites, mobile applications or other e-commerce environments, allow customers to place orders via the e-commerce platform that are subsequently fulfilled using various processes. During such order fulfillment processes, a product or service that is ordered by the customer may not be available. The availability of a product or service can be affected for example by stock shortages, increased demand, inventory losses, manufacturing issues or delivery delays. When a product or service is unavailable after a customer has placed an order for that product or service, a substitute product or service may be recommended to be included with the order instead of the product or service that is unavailable.

Order fulfillment processes can result in decreases sales, and/or reduced customer satisfaction if the substitute product or service is an undesirable substitute to the customer. Conversely, order fulfillment processes can result in increased sales and improved customer satisfaction when the substitute product or service is a suitable replacement for an unavailable product or service. Conventionally, such order fulfillment processes may be implemented by order fulfillment systems that recommend or indicate, to order fulfillment associates, replacements for unavailable products or services originally ordered by the customer. However, such order fulfillment systems may not take into account data already obtained by the system regarding engagements and interactions between the customer and the system (e.g., user session data). As such, the order fulfillment processes implemented by the conventional order fulfillment systems may still result in decreased sales, reduced customer satisfaction, and/or wasted system and computational resources because the determined replacements or substitutions were not suitable enough.

SUMMARY

The embodiments described herein are directed to substitution recommendation systems associated with one or more channels of ecommerce entities, such as an online ecommerce platform with a search engine. In accordance with various embodiments, exemplary computing systems may be implemented in any suitable hardware or hardware and software, such as in any suitable computing device. In some embodiments a system may a memory resource storing instructions and one or more processors coupled to the memory resource. In some examples, the one or more processors may be configured to execute the instructions to during a current browser session, obtain, from a first computing device of a user of the plurality of users, add-to-cart data characterizing a set of anchor items and an indication of a most recently added anchor item. Additionally, the one or more processors may be configured to execute the instructions to obtain, from the database, (i) user data associated with the user, (ii) transaction data associated with the user, and (iii) substitution data associated with the most recently added anchor item. Moreover, the one or more processors may be configured to execute the instructions to, based at least on the add-to-cart data obtained during the current browser session, the user data of the user and the transaction data of the user, implement a first set of operations that generate a first set of data characterizing an importance of the most recently added anchor item to the user. Further, the one or more processors may be configured to execute the instructions to, based at least on the add-to-cart data, the user data of the user, and the substitution data of the most recently added anchor item, implement a second set of operations that generate a second set of data characterizing a likelihood of an occurrence of a substitution rejection event associated with the user. That way, the one or more processors may be configured to execute the instructions to generate output data based on the first set of data and the second set of data, and implement a set of notification operations based on the output data.

In other embodiments, a computer-implemented method is provided that includes, during a current browser session, obtaining, from a first computing device of a user of the plurality of users, add-to-cart data characterizing a set of anchor items and an indication of a most recently added anchor item. Additionally, the computer-implemented method further includes obtaining, from the database, (i) user data associated with the user, (ii) transaction data associated with the user, and (iii) substitution data associated with the most recently added anchor item. Moreover, the computer-implemented method includes, based at least on the add-to-cart data obtained from the current browser session, the user data of the user, and the transaction data of the user, implementing a first set of operations that generate a first set of data characterizing an importance of the most recently added anchor item to the user. Further, the computer-implemented method includes, based at least on the add-to-cart data obtained from the current browser session, the user data of the user, and the substitution data of the most recently added anchor item, implementing a second set of operations that generate a second set of data characterizing a likelihood of an occurrence of a substitution rejection event associated with the user. That way, the computer-implemented method includes generating output data based on the first set of data and the second set of data, and implementing a set of notification operations based on the output data.

In various embodiments, a non-transitory computer readable medium has instructions stored thereon, where the instructions, when executed by the at least one or more processors, cause a system to, during a current browser session, obtain, from a first computing device of a user of the plurality of users, add-to-cart data characterizing a set of anchor items and an indication of a most recently added anchor item. Additionally, the system may be configured to obtain, from the database, (i) user data associated with the user, (ii) transaction data associated with the user, and (iii) substitution data associated with the most recently added anchor item. Moreover, the system may be configured to, based at least on the add-to-cart data obtained from the current browser session, the user data of the user, and the transaction data of the user, implement a first set of operations that generate a first set of data characterizing an importance of the most recently added anchor item to the user Further, the system may be configured to, based at least on the add-to-cart data obtained from the current browser session, the user data of the user, and the substitution data of the most recently added anchor item, implement a second set of operations that generate a second set of data characterizing a likelihood of an occurrence of a substitution rejection event associated with the user. That way, the system may generate output data based on the first set of data and the second set of data, and implement a set of notification operations based on the output data.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
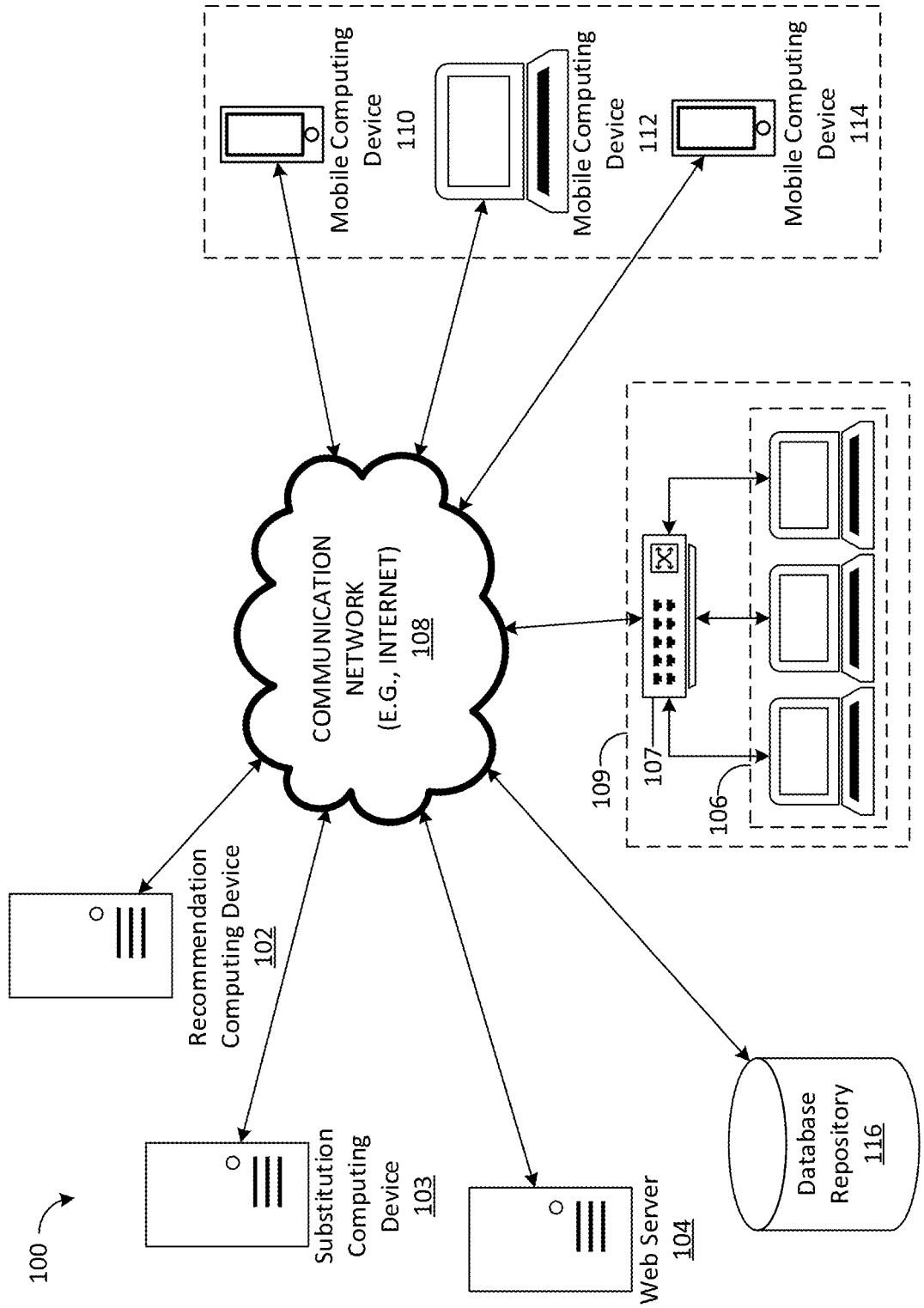
FIG. 1 is a block diagram of an example substitution recommendation system that includes a recommendation computing device.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

FIG. 1 illustrates a block diagram of an example substitution recommendation system 100 that includes recommendation computing device 102 (e.g., a server, such as an application server), a substitution computing device 103, a web server 104, data repository 116, multiple customer mobile computing devices 110, 112, and 114 operatively coupled over communication network 108. Recommendation computing device 102, web server 104 and multiple customer mobile computing devices 110, 112, and 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 108.

In some examples, recommendation computing device 102 can be a computer, a workstation, a laptop, a server such as a cloud-based server, or any other suitable device. In some examples, each of multiple customer mobile computing devices 110, 112, and 114 can be a cellular phone, a smart phone, a tablet, a personal assistant device, a voice assistant device, a digital assistant, a laptop, a computer, or any other suitable device. In some examples, recommendation computing device 102 is operated by a retailer, and multiple customer mobile computing devices 110, 112, and 114 are operated by customers of the retailer.

Although FIG. 1 illustrates three customer mobile computing devices 110, 112, and 114, substitution recommendation system 100 can include any number of customer mobile computing devices 110, 112, 114. Similarly, substitution recommendation system 100 can include any number of recommendation computing device 102, web server 104, and data repository 116.

Substitution recommendation system 100 may include workstation(s) 106. Workstation(s) 106 are operably coupled to communication network 118 via router (or switch) 107. Workstation(s) 106 and/or router 107 may be located at particular store associated with substitution recommendation system 100, such as a store 109, for example. Workstation(s) 106 can communicate with recommendation computing device 102 over communication network 108. The workstation(s) 106 may send data to, and receive data from, recommendation computing device 102. For example, the workstation(s) 106 may transmit inventory data associated with store 109 to recommendation computing device 102. In some examples inventory data may characterize the inventory of one or more products or items at store 109. In various implementations, workstations(s) 106 may periodically update the inventory data. The updated inventory data may reflect the current inventory of one or more products or items of store 109. In some examples, recommendation computing device 102 may determine, in response to and based on the received inventory data, the current inventory of each item of store 109. Further, recommendation computing device 102 may store in data repository 116, data characterizing, for store 109, the current inventory of each item of store 109 within a corresponding data repository 116, such as inventory data.

In various examples, workstation(s) 109 may transmit acceptance data related to one or more orders purchased by customers (e.g., users or customers operating mobile computing device 110, 112, 114) and associated with a particular store, such as store 109 to recommendation computing device 102. The acceptance data may characterize or indicate, for each order of each customer and for a particular store, whether, a particular item was replaced by a substitute item and whether the customer accepted the substitute item at pickup. In some examples, recommendation computing device 102 may determine, in response to and based on the received acceptance data and for each of the one or more orders, whether a particular item may have been replaced by a substitute item and whether the associated customer accepted the substitute item at pickup. Further, recommendation computing device 102 may store in data repository 116, data characterizing each of the one or more orders, the corresponding customer (e.g., by customer ID or visitor ID), the corresponding one or more items replaced by the substitute item, the substitute item, and the corresponding customer response to the substitute item (e.g., whether or not the customer accepted or rejected the substitute item), within a corresponding data repository 116, such as acceptance data.

Although FIG. 1 illustrates a single store 109, substitution recommendation system 100 may include any number of store(s) 109. Additionally, each store may include a computing system comprising workstations similar to workstation(s) 106. In implementations where substitution recommendation system 100 includes multiple stores 109, data transmitted to recommendation computing device 102 may include identifying information associated with a particular store 109. For example, workstation 106 of a particular store 109 may transmit inventory data of the particular store 109 to recommendation computing device 102. The transmitted inventory data may include location data (e.g., an address, geographical coordinates, etc.) and/or a stored identifier associated with an/or corresponding to the particular store 109.

In some examples, web server 104 may host one or more web pages, such as a retailer's website. The website may allow for the purchase of items. Web server 104 may transmit transaction data related to orders purchased on the website by customers to recommendation computing device 102. In some examples, recommendation computing device 102 may, in response to and based on the received transaction data, each of the one or more orders to determine one or more items purchased in each of the one or more orders and a corresponding customer. Additionally, recommendation computing device 102 may further identify an item type each of the one or more items are associated with. Further, recommendation computing device 102 may store in data repository 116, data characterizing each of the one or more orders, the corresponding customer (e.g., by customer or visitor ID), the corresponding one or more items, and the associated item type within a corresponding data repository 116, such as transaction data.

In some examples, web server 104 transmits user session data to recommendation computing device 102. The user session data identifies events associated with browser sessions and may include user interaction or engagement data characterizing events such as, add-to-cart events, substitution events (e.g., one or more instances the corresponding user selected or rejected recommended one or more substitute items associated with one or more anchor items), and click events. As described herein, a substitution event may characterize an instance, during a browser session, a user accepted or rejected one or more recommended substitute items associated with an anchor item. Additionally, in response to and based on receiving user session data, recommendation computing device 102 may determine add-to-to cart events, substitution events and click events associated with a corresponding user. Further, recommendation computing device 102 may store in data repository 116, data characterizing add-to-to cart events, substitution events and click events associated with a corresponding customer, within a corresponding data repository 116, such as engagement data.

First customer mobile computing device 110, second customer mobile computing device 112, and N$^{th}$ mobile computing device 114 may communicate with web server 104 over communication network 108. For example, each of multiple mobile computing devices 110 and 112 may be operable to view, access, and interact with a website hosted by web server 104. In some examples, web server 104 hosts a website for a retailer that allows for the purchase of items.

The website may further allow a customer to search for items on the website via, for example, a search bar. A customer operating one of multiple mobile computing devices 110, 112 may access the website and perform a search for items on the website by entering in one or more terms into the search bar. In response, the website may return search results identifying one or more items, as described above and further herein. In various implementations, the returned search results may include a graphical representation for each of the one or more items, and one or more interactive features that, when interacted with, triggers a one or more operations. For example, the interactive feature may enable the customer to add one or more of the items or anchor items to an online shopping cart, and allow the customer to perform a "checkout" of the shopping cart to purchase the added anchor items. In some examples, the customer may indicate that the anchor items are to be picked up at a future time interval. Additionally, the customer may further indicate that a particular store 109 the customer is to pick up the one or more anchor items. In another example, the interactive feature may, when interacted with, cause the website to display additional information about the corresponding item. In other implementations, the graphical representations for each of the one or more items may be an interactive feature or have one or more interactive elements, that when interacted with, causes the website to display additional information regarding the corresponding items.

Recommendation computing device 102 is operable to communicate with data repository 116 over communication network 118. For example, recommendation computing device 102 can store data to, and read data from, data repository 116. Data repository 116 can be a remote storage device, such as a cloud-based server, a disk (e.g., a hard disk), a memory device on another application server, a networked computer, or any other suitable remote storage. Although shown remote to recommendation computing device 102, in some examples, data repository 116 can be a local storage device, such as a hard drive, a non-volatile memory, or a USB stick. Recommendation computing device 102 may store purchase data, inventory data, acceptance data and location data received from store 109 and/or web server 104 in data repository 116. Recommendation computing device 102 may also store user session data identifying events associated with browsing sessions, such as when a customer browses a website hosted by web server 104. In various examples, the user session data may include user interaction or engagement data characterizing events, such as, add-to-cart events, click events, and substitution events.

In some examples, data repository 116 may store substitution data generated by substitution computing device 103. Substitution data may, for each customer (e.g., users or customers operating mobile computing device 110, 112, 114), identify one or a set of substitution items for each item the customer included in a purchase order (e.g., an anchor item). Additionally, the substitution data may include a relevance score for each of the one or the set of substitution items. The relevance score may indicate the suitability of the particular substitution item to replace the anchor item (e.g., the higher the score, the more suitable the particular substitution item is as a replacement for the anchor item).

In various implementations, substitution computing device 103, during a current browser session of a particular customer, may obtain engagement data characterizing add-to-cart events from web server 104. The engagement data may characterize one or more add-to-cart events, and each add-to-cart event may identify an anchor item the customer has selected and added to an electronic cart of an online platform, such as a retail website hosted by web server 104. Substitution computing device 103 may utilize the engagement data characterizing add-to-cart events to generate substitution data characterizing one or a set of substitute items that may suitable replacements for the one or more anchor items identified in the engagement data.

In some implementations, web server 104 may transmit, engagement data characterizing an add-to-cart event to substitution computing device 103 subsequently after each time the customer selects and adds to the electronic cart a new anchor item. Further, substitution computing device 103 may generate and transmit, to web server 104, substitution data characterizing one or a set of substitute items for each newly added anchor item along with relevance score data of each of the one or a set of substitute items. For example, in a first instance, a user, via an application executing on the computing device of the user (e.g., mobile computing device 110, 112, 114), adds an anchor item to the electronic cart. Additionally, the application may transmit, to the substitution computing device 103, engagement data characterizing the add-to-cart event of the user adding the anchor item to the electronic cart at the first instance. In response to the received engagement data, substitution computing device 103 may generate and transmit substitution data to recommendation computing device 102. Substitution computing device 103 may generate and transmit substitution data associated with the engagement data of different instances, in response to engagement data of each particular instance is obtained.

In various examples, data repository 116 may store catalog data. Catalog data may include, for each item of a particular store 109, item ID, item brand, item type, item description, and item price. Additionally, recommendation computing device 102 may utilize catalog data to determine and generate output data associated with a particular user including notification values for each of one or more anchor items the particular user added to an electronic cart of an online platform during a current browser session. In some examples, the notification values for each of the one or more anchor items may each characterize a likelihood of an occurrence of a substitution item rejection event associated with an anchor item and/or an importance of the anchor item to the particular user.

In some examples, data repository 116 may store one or more machine learning models that, when adaptively trained and validated, may be executed by recommendation computing device 102 to determine and generate output data associated with a particular user. The output data may include a notification value for each of one or more anchor items the particular user added to an electronic cart of an online platform. In some implementations, the notification value for each of the one or more anchor items may each characterize a likelihood of an occurrence of a substitution item rejection event associated with an anchor item and/or an importance of the anchor item to the particular user.

In various examples, the output data may be utilized by recommendation computing device 102 to determine whether to cause an application executing on a computing device (e.g., mobile computing device 110, 112, 114) of a user to generate and present a substitution item notification. For example, if the notification value for a particular anchor item is above or equal to a particular threshold value, recommendation computing device 102 may cause an application executing on a computing device (e.g., mobile computing device 110, 112, 114) of a user to generate a substitution item notification. The substitution item notification, may include content identifying one or a set of substitute items for the anchor item. Additionally, the recommendation computing device 102 may cause the application to generate the substitution item notification with a graphical representation or one or more substitution item related content items of each of the one or the set of substitute items along with a selectable feature. The selectable feature may be configured such that when selected, executed or interacted with, the application may generate replacement data characterizes a corresponding substitute item as a replacement to the particular anchor item, in the event the particular anchor item is out of stock (OOS) at a particular future time interval (e.g., a time interval when the order is being fulfilled). In various implementations, after the user "checks out" or finalizes the order, the application generates order data that includes the replacement data for at least the particular anchor item. In the event that the particular anchor item is out of stock at the future time interval, the order data may cause an order fulfillment system (not shown in FIG. 1 and may be included with substitution recommendation system 100) to automatically replace the particular anchor item with the substitute item identified in the selected substitution data without any further communications or utilization of computation resources of any system to obtain additional data from the user regarding the out of stock particular anchor item.

In some implementations, the output data including the notification values may be based on one or more anchor items identified from engagement data obtained during a current browser session of an online platform, such as a retail website hosted by web server 104. For example, during a current browser session a user initiated on their respective computing device (e.g., mobile computing device 110, 112, 114), the user may add one or more anchor items to an electronic cart associated with the online platform. Web server 104 or computing device of the user may transmit, to recommendation computing device 102, engagement data, including add-to-cart events characterizing each instance the user added an anchor item to the electronic cart. In some implementations, web server 104 may transmit, to recommendation computing device 102, the engagement data characterizing the add-to-cart event of a particular anchor item each time the particular anchor item is added to the electronic cart. In some examples, the engagement data may include data identifying a particular store 109 the user indicates will be the pickup location for the one or more anchor items.

In some examples, recommendation computing device 102 may implement operations that generate, for each of the one or more anchor items identified from engagement data obtained during a current browser session of the online platform, output data including a corresponding notification value. Additionally, in implementations where the recommendation computing device 102 obtains, from web server 104, the engagement data of each add-to-cart event after each add-to-cart event, recommendation computing device 102 may generate the output data including the notification value for each anchor item identified in the engagement data as the engagement data is obtained. That way, recommendation computing device 102 may determine whether to cause the application executing on the computing device of the user (e.g., user or customer of mobile computing device 110, 112 or 114) to generate and present a substitution item notification as each anchor item is added to the electronic cart.

In other examples, recommendation computing device 102 may implement operations that generate the output data based on one or more extracted features or data. The features or data may be extracted from transaction data of the user, engagement data of the user, store data and/or catalog data. In some examples, the operations to generate the output data may include extracting, from the catalog data, attribute features of the anchor item. Examples of attribute feature of the anchor item include, item ID, item brand, item type, item description and item price. Further, recommendation computing device 102 may store in data repository 116, data characterizing the attribute features of the anchor item within a corresponding data repository 116, such as catalog data.

In various examples, the operations to generate the output data may include extracting, from the catalog data, attribute features of substitute items associated with the anchor item. For example, recommendation computing device may obtain substitute data of an anchor item identified from engagement data of an add-to-cart event and identify one or more substitute items from the substitute data. Additionally, based on the identified one or more substitute items, recommendation computing device 102 may extract from the catalog data one or more attribute features of each of the one or more identified substitute items. Examples of attribute feature of the substitute items include, item ID, item brand, item type, item description and item price. Further, recommendation computing device 102 may store in data repository 116, data characterizing the attribute features of the substitute items within a corresponding data repository 116, such as catalog data.

In some examples, the operations to generate the output data may include extracting, from the transaction data, substitution selection data. The substitution data of the transaction data may characterize, for each online purchase order of each customer, one or more recommended substitution items associated with one or more anchor items, and whether each of the one or more recommended substitution items were accepted or rejected. Further, recommendation computing device 102 may store in data repository 116, the substitution selection data of the transaction data within a corresponding data repository 116, such as substitution data. In various implementations, recommendation computing device 102 may determine and generate, based on the substitution selection data, preference data characterizing a substitution item preference of one or more anchor items. Preference data 324 may indicate, for each customer and for one or more anchor items the customer has added to an electronic cart, a substitution item preference. For example, a substitution item the corresponding customer would likely select for an anchor item, if the anchor item were to become unavailable at a future time interval (e.g., at fulfillment). Further, recommendation computing device 102 may store in data repository 116, the preference data within a corresponding data repository 116, such as preference data.

In some examples, the operations to generate the output data may further include extracting, from the engagement data, cart break data. Cart break data may characterize one or more cancellation events. A cancellation event may indicate a cancellation of a purchase order in response to a notification that one or more anchor items of the purchase order is unavailable. Additionally, a cancellation event may include browser sessions that terminated before a user initiated "checkout" procedures on the application executing on a computing device of the user (either due to the user logging out or the browser session timing out) and after the user selected an unavailable anchor item. Further, recommendation computing device 102 may store in data repository 116, cart break data within a corresponding data repository 116, such as cart break data.

In other examples, the operations to generate the output data may include extracting, from the engagement data, substitution selection data charactering, for each browsing session, one or more instances a user engaged with a substitution notification. In various implementations, the substitution notification may be presented for a particular anchor item. Additionally, the substitution notification may include one or a set of substitute items associated with the particular anchor item. Further, the substitution selection data may include data characterize a type of engagement of the substitution item notification (e.g., accepting/rejecting a particular substitution item recommendation, or ignoring one or more substitution item recommendations). In some examples, recommendation computing device 102 may store in data repository 116, substitution selection data of the engagement data within a corresponding data repository 116, such as engagement data.

In various implementations, recommendation computing device 102 may generate acceptance data based on the substitution selection data. The acceptance data may characterize, for each anchor item, the frequency at which the user accepts the recommended one or a set of substitution items and the particular substitution item the user selects. Additionally, recommendation computing device 102 may generate substitution rejection data based on the substitution selection data. The substitution rejection data may characterize, for each anchor item, the frequency at which the user rejects any and all of the recommended one or a set of substitution items and the particular substitution item the user explicitly (e.g., user actually selects) or implicitly rejects (e.g., user doesn't select or ignores). Further, recommendation computing device 102 may store in data repository 116, acceptance data and the substitution rejection data within a corresponding data repository 116, such as acceptance data and the substitution rejection data, respectively.

In various implementations, the output data may be based on a first set of data characterizing an importance of the anchor item to the user and/or a second set of data characterizing a likelihood of an occurrence of a substitution rejection event associated with the anchor item. In some examples, recommendation computing device 102 may implement a first set of operations that generate the first set of data. Additionally, recommendation computing device 102 may apply a first trained and validated machine learning model to one or more extracted features/data associated with engagement data of the user, transaction data of the user, store data of a particular store, such as store 109, and/or catalog data. Examples of extracted features or data include at least, cart break data, acceptance data, substitution rejection data, anchor item attribute feature data, transaction data 321, and OOS data.

In some examples, the importance of an anchor item may be defined by the likelihood that the unavailability of the anchor item would result in a cancellation event. As described herein, a cancellation event may indicate a cancellation of a purchase order in response to a notification that one or more anchor items of the purchase order is unavailable. Additionally, a cancellation event may include browser sessions that terminated before a user initiated "checkout" procedures on the application executing on a computing device of the user (either due to the user logging out or the browser session timing out) and after the user selected an unavailable anchor item. In such examples, executed cart engine may utilize OOS data associated with the anchor item when determining the importance of the anchor item. That way, executed cart engine 306 may determine the likelihood that the anchor item may go out of stock at a future time interval (e.g., at fulfillment).

In other examples, recommendation computing device 102 may implement a second set of operations that generate the second set of data. Additionally, recommendation computing device 102 may apply a second trained and validated machine learning model to one or more extracted features/data associated with engagement data of the user, transaction data of the user, store data of a particular store, such as store 109, and/or catalog data. Examples of extracted features or data include at least, substitution data, acceptance data, substitution rejection data, anchor item attribute feature data, transaction data, inventory data and OOS data.

In various implementations, recommendation computing device 102 may utilize a first set of data characterizing the importance of an anchor item data identified from a current browser session, and/or a second set of data characterizing the likelihood an occurrence of a substitution rejection event of the anchor item to generate the output data. In such implementations, recommendation computing device 102 may combine the first set of data and/or the second set of data to generate the output data.

Figure 2:
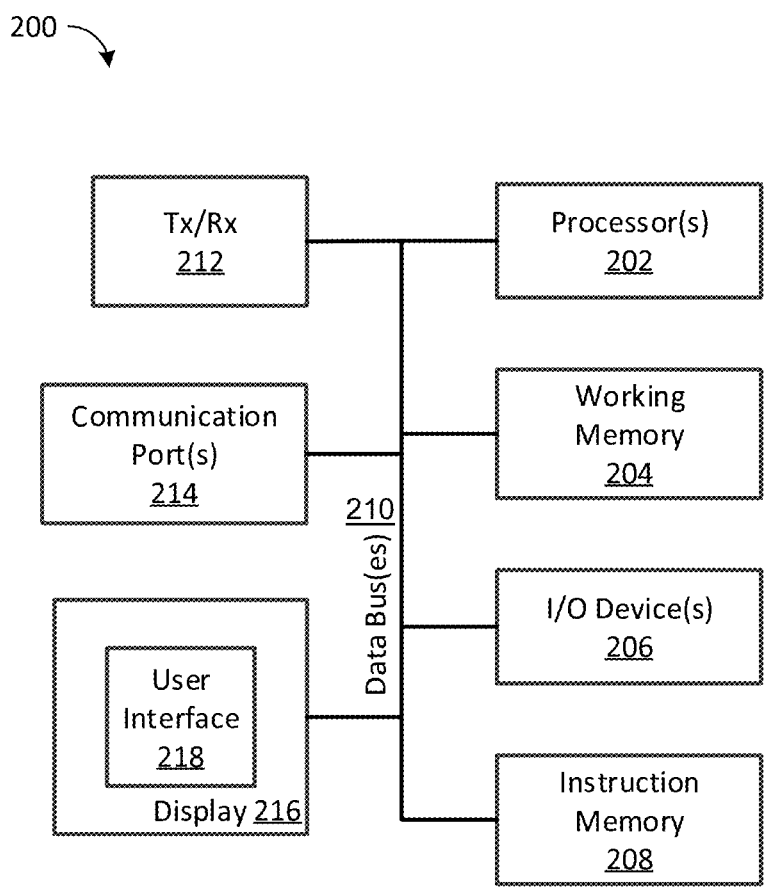
FIG. 2 illustrates a block diagram of example recommendation computing device of FIG. 1 in accordance with some embodiments.

FIG. 2 illustrates a block diagram of example recommendation computing device 102 of FIG. 1. Recommendation computing device 102 can include one or more processors 202, working memory 204, one or more input/output devices 206, instruction memory 208, a transceiver 212, one or more communication ports 214, and a display 216, all operatively coupled to one or more data buses 210. Data buses 210 allow for communication among the various devices. Data buses 210 can include wired, or wireless, communication channels.

Processors 202 can include one or more distinct processors, each having one or more cores. Each of the distinct processors can have the same or different structure. Processors 202 can include one or more central processing units (CPUs), one or more graphics processing units (GPUs), application specific integrated circuits (ASICs), digital signal processors (DSPs), and the like.

Instruction memory 208 can store instructions that can be accessed (e.g., read) and executed by processors 202. For example, instruction memory 208 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. Processors 202 can be configured to perform a certain function or operation by executing code, stored on instruction memory 208, embodying the function or operation. For example, processors 202 can be configured to execute code stored in instruction memory 208 to perform one or more of any function, method, or operation disclosed herein.

Additionally, processors 202 can store data to, and read data from, working memory 204. For example, processors 202 can store a working set of instructions to working memory 204, such as instructions loaded from instruction memory 208. Processors 202 can also use working memory 204 to store dynamic data created during the operation of recommendation computing device 102. Working memory 204 can be a random access memory (RAM) such as a static random access memory (SRAM) or dynamic random access memory (DRAM), or any other suitable memory.

Input/output devices 206 can include any suitable device that allows for data input or output. For example, input/output devices 206 can include one or more of a keyboard, a touchpad, a mouse, a stylus, a touchscreen, a physical button, a speaker, a microphone, or any other suitable input or output device.

Communication port(s) 214 can include, for example, a serial port such as a universal asynchronous receiver/transmitter (UART) connection, a Universal Serial Bus (USB) connection, or any other suitable communication port or connection. In some examples, communication port(s) 214 allows for the programming of executable instructions in instruction memory 208. In some examples, communication port(s) 214 allow for the transfer (e.g., uploading or downloading) of data, such as interaction data, product data, and/or keyword search data.

Display 216 can display user interface 218. User interface 218 can enable user interaction with recommendation computing device 102. For example, user interface 218 can be a user interface for an application of a retailer that allows a customer to view and interact with a retailer's website. In some examples, a user can interact with user interface 218 by engaging input/output devices 206. In some examples, display 216 can be a touchscreen, where user interface 218 is displayed on the touchscreen.

Transceiver 212 allows for communication with a network, such as the communication network 108 of FIG. 1. For example, if communication network 108 of FIG. 1 is a cellular network, transceiver 212 is configured to allow communications with the cellular network. In some examples, transceiver 212 is selected based on the type of communication network 108 recommendation computing device 102 will be operating in. Processor(s) 202 is operable to receive data from, or send data to, a network, such as communication network 108 of FIG. 1, via transceiver 212.

Notification Value Determination

Figure 3:
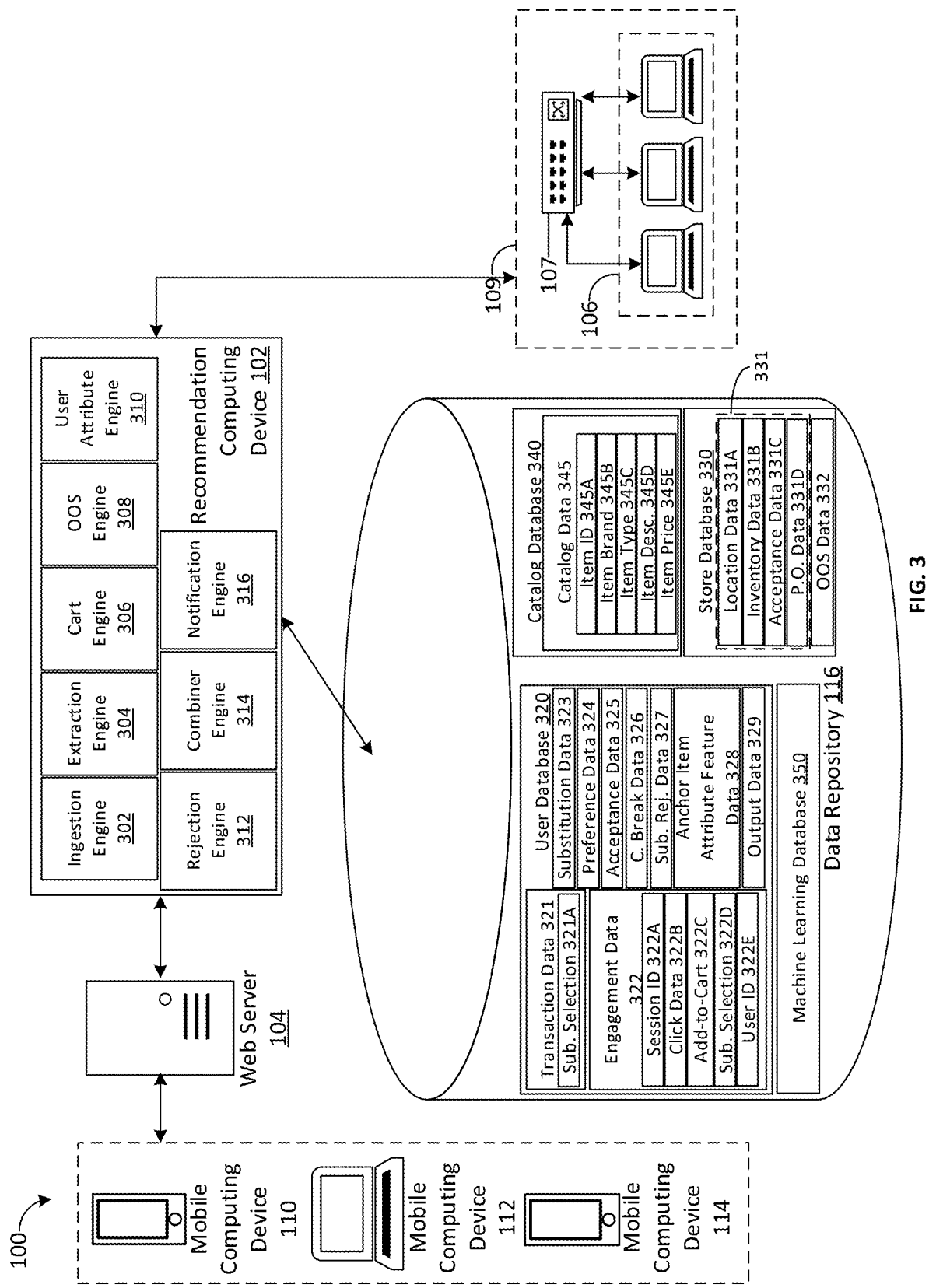
FIG. 3 is a block diagram illustrating examples of various portions of the recommendation computing device of FIG. 1 in accordance with some embodiments.

FIG. 3 is a block diagram illustrating examples of various portions of the recommendation computing device 102. As illustrated in FIG. 3, recommendation computing device 102 can include ingestion engine 302, extraction engine 304, cart engine 306, out of stock (OOS) engine 308, user attribute engine 310, rejection engine 312, combiner engine 314, and notification engine 316. In some examples, one or more of ingestion engine 302, extraction engine 304, cart engine 306, OOS engine 308, user attribute engine 310, rejection engine 312, combiner engine 314, and notification engine 316 may be implemented in hardware. In other examples, one or more of ingestion engine 302, extraction engine 304, cart engine 306, OOS engine 308, user attribute engine 310, rejection engine 312, combiner engine 314, and notification engine 316 may be implemented as an executable program maintained in a tangible, non-transitory memory, such as instruction memory 208 of FIG. 2, that may be executed by one or processors, such as processor 202 of FIG. 2.

As illustrated in FIG. 3, data repository 116, may include user database 320. In some examples, user database 320 may store one or more data elements of user session data within user database 320. For example, recommendation computing device 102 may receive user session data from web server 104. Additionally, recommendation computing device 102, may execute ingestion engine 302 to obtain one or more elements of user session data and store the one or more elements of user session data within user database 320. In some examples, user session data may be related one or more browser sessions of a plurality of users of the online platform (e.g., the website hosted by web server 104). Additionally, user session data may include engagement data 322. Engagement data 322 includes a session ID 322A (i.e., a website browser session identifier), click data 322B identifying click events where the user clicked (e.g., images of items for purchase, keywords to filter reviews for an item) and corresponding timestamps of each click event, add-to-cart data 322C identifying add-to-cart events where the user adds an anchor item to an online shopping cart and corresponding timestamps of each event, and substitution selection data 322D identifying substitution events (e.g., one or more instances a user selected or rejected recommended one or more substitute items associated with the anchor item), and corresponding timestamps of each instance, and user ID data 322E (e.g., a customer ID, visitor ID, etc.) identifying a user ID for each of the plurality of customers of the online platform. In various implementations, each event (e.g., click event, add-to-cart event, and/or substitution event) may be linked or associated with a particular user ID 322E of a customer.

User database 320 may also store substitution data 323. In various implementations, recommendation computing device 102 may receive, from substitution computing device 103, substitution data 323 for each anchor item identified from each add-to-cart even identified in the add-to-cart data 322C of a particular customer (e.g., user or customer of mobile computing device 110, 112, 114). Substitution data 323 may, identify one or a set of substitution items for each anchor item. Additionally, the substitution data may include relevance score data including a relevance score for each of the one or the set of substitution items. The relevance score may indicate the suitability of the particular substitution item to replace the anchor item (e.g., the higher the score, the more suitable the particular substitution item is as a replacement for the anchor item).

User database 320 may also store cart break data 326. In some implementations, recommendation computing device 102 may execute extraction engine 304 to extract or obtain, for each user, cart break data 326 from user session data obtained from web server 104. Cart break data may characterize one or more cancellation events. A cancellation event may indicate a cancellation of a purchase order in response to a notification that one or more anchor items of the purchase order became unavailable at a future date (e.g., a time period when the purchase order is being fulfilled, such as when an associate is gathering the anchor items for pickup). Further extraction engine 304 may store the extracted or obtained cart break data 326 of each user within user database 320, such as cart break data 326.

User database 320 may store substitution selection data 322D of engagement data 322. In some implementations, recommendation computing device 102 may execute extraction engine 304 to extract or obtain, for each user, substitution selection data 322D from user session data obtained from web server 104. Substitution selection data 322D may characterize, for each browser session of each user, one or more instances a user engaged with a substitution item notification. In various implementations, the substitution item notification may be presented for a particular anchor item. Additionally, the substitution item notification may include content items or graphical features associated with each of the one or a set of substitute items associated with the particular anchor item. Further, the substitution selection data 322D may include data characterize a type of engagement of any of the content items or graphical features included with the substitution item notification (e.g., engagement of a content item or graphical features characterizing accepting/rejecting a particular substitution item recommendation, or an engagement or interaction characterizing a user ignoring one or more substitution item recommendations). Further extraction engine 304 may store the extracted or obtained substitution selection data 322D of each user within user database 320, such as substitution selection data 322D.

User database 320 may store acceptance data 325. In some implementations, recommendation computing device 102 may execute user attribute engine 310 to determine and generate, for each user, acceptance data 325 based on substitution selection data 322D. The acceptance data 325 may characterize, for each anchor item, the frequency at which the user accepts the recommended one or a set of substitution items and the particular substitution item the user selects. Additionally, user database 320 may store substitution rejection data 327. In some implementations, recommendation computing device 102 may execute user attribute engine 310 to determine and generate, for each user, substitution rejection data 327 based on substitution selection data 322D. The substitution rejection data 327 may characterize, for each anchor item, the frequency at which the user rejects any and all of the recommended one or a set of substitution items and the particular substitution item the user explicitly (e.g., user actually selects) or implicitly rejects (e.g., user doesn't select or ignores). Further extraction engine 304 may store the extracted or obtained acceptance data 325 and substitution rejection data 327 of each user within user database 320, such as acceptance data 325 and substitution rejection data 327.

User database 320 may also store transaction data 321 of one or more customers or users of an online platform. In some example, recommendation computing device 102 may receive online purchase data from web server 104, which identifies and characterizes one or more online purchase orders of one or more anchor items from an online platform, such as a retailer's website hosted by web server 104. Additionally, the online purchase data may include data characterizing whether any of the anchor items were unavailable at a future time interval (e.g., at fulfilment) and if unavailable, whether replacement and recommended substitute item was accepted by the corresponding customer. The one or more online purchases may be associated with of one or more users of the online platform. In various implementations, recommendation computing device 102 may obtain online purchase data of a particular time interval (e.g., a particular month, year, number of years, etc.) Executed ingestion engine 302 may parse online purchase data to generate transaction data 321 of the one or more users of the online platform within in user database 320.

User database 320 may also store substitution selection data 321A associated with transaction data 321. In some examples, recommendation computing device 102 may execute extraction engine 304 to extract or obtain, for each user, substitution selection data 321A from transaction data 321. The substitution selection data 321A may characterize, for each online purchase order of each customer, one or more recommended substitution items associated with one or more anchor items, and whether each of the one or more recommended substitution items were accepted or rejected. Additionally, extraction engine 304 may store the substitution selection data 321A within user database 320, such as substitution selection data 321A.

User database 320 may also store preference data 324. In various implementations, recommendation computing device 102 may determine and generate, for each user, preference data 324 based on substitution selection data 321A. Additionally, recommendation computing device 102 may execute user attribute engine 310 to determine and generate, for each user, preference data 324 based on substitution selection data 321A. Preference data 324 may indicate, for each customer and for each of the one or more anchor items the customer has added to an electronic cart, a substitution item preference, if the anchor item were to become unavailable at a future time interval (e.g., at fulfillment). In some examples, the substitution item preference may indicate a particular substitution item. Additionally, or alternatively, in other examples, the substitution item preference may indicate attribute features of substitution items the corresponding customer would likely select for an unavailable anchor item. In such examples, recommendation computing device 102 may execute user attribute engine 310 to determine attribute features (e.g., item brand 345B, item type 345C, features derived from item description 345D, item price 345E, etc.) of the preferred substitute items based in part on catalog data 345. Further, user attribute engine 310 may store in data repository 116, preference data 324 within a corresponding data repository 116, such as preference data.

User database 320 may also store output data 329 associated with a particular user. In various examples, output data 329 may include notification values for each of one or more anchor items the particular user added to an electronic cart of an online platform. Further, the notification values for each of the one or more anchor items may each characterize a likelihood of an occurrence of a substitution item rejection event associated with an anchor item and/or an importance of the anchor item to the particular user. In some implementations, recommendation computing device may execute cart engine 306, rejection engine 312 and/or combiner engine 314 to generate output data 329. In such implementations, executed cart engine 306, rejection engine 312 and/or combiner engine 314 may utilize data stored in data repository 116 to generate output data 329.

Additionally, data repository 116 may include catalog database 340. Catalog database 340 may store catalog data 345, which may identify one or more attributes of a plurality of items, such as a portion of or all items a retailer carries. Catalog data 345 may identify, for each of the plurality of items, an item ID 345A (e.g., an SKU number), item brand 345B, item type 345C (e.g., grocery item such as milk, clothing item), item description 345D (e.g., a description of the product including product features, such as ingredients, benefits, use or consumption instructions, or any other suitable description), and item price 345E.

User database 320 may store anchor item attribute feature data 328 characterizing attribute features of one or more anchor items. In various implementations, recommendation computing device 102 may execute extraction engine 304 to extract or obtain one or more attribute features of one or more anchor items from catalog data 345. An anchor item may be identified from an add-to-cart event identified in add-to-cart data 322C. Each add-to-cart event identified in add-to-cart data 322C may be associated with a user of the plurality of users of the online platform. Additionally, extraction engine 304 may store the extracted or obtained anchor item attribute feature data 328 of one or more anchor items within user database 320, such as anchor item attribute feature data 328. Examples of attribute feature of the substitute items include, item ID 345A, item brand 345B, item type 345C, attribute features further extracted from item description 345D and item price 345E.

Moreover, data repository 116 may further include store database 330. Store database 330 may store, for each store associated with substitution recommendation system 100, such as store 109, store data 331. Store data 331 of each store may include location data 331A identifying a location of the store (e.g., an address, geographical coordinates, etc.) and a store identifier associate with and/or corresponding to the particular store, and inventory data 331B.

In some examples, inventory data 331B may indicate the inventory of one or more products or items of a particular store, such as store 109. In various implementations, inventory data 331B may be periodically updated (e.g., by workstations(s) 106). The updated inventory data 331B may reflect the current inventory of one or more products or items of the particular store. In some examples, recommendation computing device 102 may execute ingestion engine 302 to store and update in data repository 116, data characterizing, for the particular store, the current inventory of each item of the particular store within a corresponding data repository 116, such as inventory data.

Store database 330 may also store out of stock (OOS) data 332 associated with a particular store. In some implementations, recommendation computing device 102 may execute OOS engine 308 to determine OOS data 332 for a particular store. For example, executed OOS engine 308 may obtain inventory data 331B associated with anchor item associated with a particular store, such as store 109 and purchase order data 331D associated with the anchor items of the particular store. Additionally, executed OOS engine 308 may determine and generate, for each anchor item of the particular store, out of stock data 332 characterizing the likelihood of the anchor item may bout of stick at a future time interval. In various implementations, corresponding historical out of stock data (not show) may be leveraged by the executed OOS engine 308 to determine and generate OOS data 332. Further, executed OOS engine 308 may store OOS data 332 in store database 330.

Store database 330 may also store acceptance data 331C related to one or more orders purchased by customers (e.g., users or customers operating mobile computing device 110, 112, 114) at one or more stores, such as store 109. Acceptance data 331C may characterize or indicate for each order of each customer whether, a particular item was replaced by a substitute item and whether the customer accepted the substitute item. In various implementations, recommendation computing device 102 may execute extraction engine 304 to extract or obtain, from acceptance data 331C of one or more customers and for each order, data characterizing the corresponding customer (e.g., by customer ID or visitor ID), the corresponding one or more anchor items replaced by the substitute item, the substitute item, and the corresponding customer response to the substitute item (e.g., whether or not the customer accepted or rejected the substitute item), within a corresponding data repository 116, such as acceptance data. Further, executed extraction engine 304 may store data characterizing, for each of order, the corresponding customer (e.g., by customer ID or visitor ID), the corresponding one or more anchor items replaced by the substitute item, the substitute item, and the corresponding customer response to the substitute item (e.g., whether or not the customer accepted or rejected the substitute item), within a corresponding data repository 116, such as acceptance data.

In some examples, data repository 116 may include machine learning database 250. Machine learning data base may include machine learning data of one or more machine learning models. Additionally, the one or more machine learning models may be adaptively trained and validated. Recommendation computing device 102 may execute the one or more adaptively trained and validated machine learning models to generate output data 329 associated with a particular user, including notification values for each of one or more anchor items the particular user added to an electronic cart of an online platform. In some implementations, the notification values for each of the one or more anchor items may each characterize a likelihood of an occurrence of a substitution item rejection event associated with an anchor item and/or an importance of the anchor item to the particular user.

In some implementations, recommendation computing device 102 may contextualize the output data 329 and notification values to a particular store, such as store 109. In such implementations, a user may indicate, via an application executing on a computing device of the user (e.g., mobile computing device 110, 112, 114), a pickup event of "checked out" user selected anchor items at the particular store. Additionally, recommendation computing device 102 may obtain transaction data 321, engagement data 322, catalog data 345, and store data 331 associated with that particular store. In such an example, the transaction data 321, engagement data 322, catalog data 345, and store data 331 may have a store ID associated with particular data elements within those data. Further, the extracted features and derived data, such as output data 329 including notification values, may be further contextualized to that particular store.

In examples where the user has indicated, via an application executing on a computing device of the user (e.g., mobile computing device 110, 112, 114), a pickup event request of "checked out" user selected anchor items at a particular store, such as store 109, recommendation computing device 102 may leverage OOS data 332 when generating output data 329 for anchor items that are likely to go out of stock at a future time interval (e.g., when the order of anchor items is to be fulfilled or picked up by an associated who is collecting the anchor items).

In various implementations, recommendation computing device 102 may implement operations that generate the output data 329 for each anchor item identified in a current browser session initiated by a user based on one or more extracted features or data of the user (e.g., extracted features and data from transaction data 321 of the user, engagement data 322 of the user, store data of a particular store catalog data). Additionally, recommendation computing device 102 may implement operations that generate the output data 329 for each anchor item by applying one or more machine learning models to the corresponding extracted features or data.

In some implementations, the operations to generate the output data 329 may include determining and generating a first set of data characterizing the importance of an anchor item identified in a current browser session initiated by a user on a computing device of the user (e.g., mobile computing device 110, 112, 114). In such implementations, recommendation computing device 102 may implement a first set of operations that generate a first set of data characterizing an importance of the anchor item data. In some examples the first set of data may include a score or value indicating the importance of the anchor item data. In other examples, the first set of operations may be based on one or more of the extracted features/data. Additionally, recommendation computing device 102 may execute cart engine 306 to implement the first set of operations. Further, executed cart engine 306 may apply a first trained and validated machine learning model (e.g., a logistic regression model) to one or more of the extracted features/data to determine and generate first set of data. In some examples, the first set of data may include a score or value that reflects the determined importance (e.g., the higher the value/score, the greater the importance).

In various implementations, executed cart engine 306 may perform operations that adaptively train a first machine-learning or artificial-intelligence process to determine an importance of an anchor item identified in a current browser session initiated by a user on a computing device of the user (e.g., mobile computing device 110, 112, 114) to the user. Additionally, the adaptively trains the first machine-learning or artificial-intelligence process using training datasets associated with a first prior temporal interval (e.g., a "training" interval), and validates the first trained machine-learning or artificial-intelligence process using validation datasets associated with a second, and distinct, prior temporal interval. In various implementations, the training dataset may be obtained from the extracted cart break data 326, acceptance data 325, substitution rejection data 327, anchor item attribute feature data 328, transaction data 321, and OOS data 332. Additionally, the obtained data elements of the extracted cart break data 326, acceptance data 325, substitution rejection data 327, anchor item attribute feature data 328, transaction data 321, and OOS data 332, may be of a first prior temporal interval. In other implementations, validation dataset may be obtained from the extracted substitution selection data 321A and substitution selection data 322D. Further, the obtained elements of the extracted substitution selection data 321A and substitution selection data 322D may be of a second and distinct prior temporal interval. Once the first machine learning model is first trained and validated, executed cart engine 306 may store the first trained and validated machine learning model in machine learning model database 350.

In some examples, the one or more extracted features/data executed cart engine 306 may utilize, to determine the first set of data characterizing the importance of an anchor item, includes anchor item attribute feature data 328. For example, recommendation computing device 102 may obtain, from web server 104 and during a current browser session, add-to-cart data 322C. Upon executed cart engine 306 identifying an anchor item of each add-to-cart event identified in the add-to-cart data 322C of the current browser session, executed cart engine 306 may obtain anchor item attribute feature data 328 associated with the identified anchor items. Anchor item attribute feature data 328 may indicate one or more attribute features of each of the identified anchor items. Additionally, executed cart engine 306 may apply the first trained and validated machine learning model to the attribute features of each anchor item identified in each add-to-cart event and compare the one or more attribute features (e.g., the item price) of the anchor item of the most recent add-to-cart event to the attribute features (e.g., the item price) of the anchor items of the previous add-to-cart events. Based in part on the comparison, the first trained and validated machine learning model may determine the importance of the most recent added anchor item. Additionally, the first trained and validated machine learning model may generate a score or value characterizing the importance of the most recently added anchor item reflecting based in part on the comparison.

In some examples, the one or more extracted features/data executed cart engine 306 may utilize, to determine the first set of data, includes cart break data 326. For example, recommendation computing device 102 obtains, from web server 104, add-to-cart data 322C characterizing an add-to-cart event of an anchor item recently added to an electronic cart of an online platform in a current browser session initiated by a user on a computing device of the user (e.g., mobile computing device 110, 112, 114). Upon executed cart engine 306 identifying the anchor item, executed cart engine

306 may obtain cart break data 326 associated with the user. Additionally, executed cart engine 306 may apply a first trained and validated machine learning model to the extracted cart break data 326 and data identifying the anchor item, to determine the importance of the anchor item. For instance, based on cart break data 326 and data identifying the anchor item, the first trained and validated machine learning model may determine whether the anchor item is associated with in a cancellation event characterized in the extracted cart break data 326 and the frequency of the cancellation events including the anchor item. In various examples, the importance of the anchor item may correlate with the frequency of the cancellation event associated with the anchor item (e.g., the higher the frequency of cancellation events due to the unavailability of the anchor item, the greater the importance). As such, based in part on such determinations, the first trained and validated machine learning model may determine the importance of the most recently added anchor item. Further, the first trained and validated machine learning model may generate a value or score that reflects the determined importance based in part on such determinations.

Additionally, in some implementations, executed cart engine 306 may leverage OOS data 332 with the cart break data 326 when determining the importance of the recently added anchor item. In such implementations, based on the cart break data 326 of the user, data identifying the anchor item, and OOS data 332 associated with the anchor item, the first trained and validated machine learning model may determine the likelihood the anchor item will go out of stock in a future time interval (e.g., during fulfillment), whether the anchor item is involved in a cancellation event characterized in the extracted cart break data 326 and the frequency of such cancellation events. Based in part on such determinations, the first trained and validated machine learning model may determine the importance of the most recently added anchor item. In some examples, the greater the likelihood the anchor item will go out of stock and the greater the frequency of such cancellation events, the higher the importance. Additionally, the first trained and validated machine learning model may generate a value or score that reflects the determined importance based in part on such determinations.

In some examples, the one or more extracted features/data executed cart engine 306 may utilize, to determine the first set of data, acceptance data 325 and/or substitution rejection data 327. For example, recommendation computing device 102 obtains, from web server 104, add-to-cart data 322C characterizing an add-to-cart event of an anchor item recently added to an electronic cart of an online platform in a current browser session initiated by a user on a computing device of the user (e.g., mobile computing device 110, 112, 114). Upon executed cart engine 306 identifying the anchor item, executed cart engine 306 may obtain extracted acceptance data 325 and/or substitution rejection data 327 associated with the user. Additionally, executed cart engine 306 may apply a first trained and validated machine learning model to the extracted acceptance data 325 and/or substitution rejection data 327 and data identifying the anchor item, to determine the importance of the anchor item to the users. For example, the acceptance data 325 and/or substitution rejection data 327 may characterize a frequency or rate at which the user accepts or rejects substation items recommended to the user for the anchor item. Based on the rate or frequency of rejection or acceptance, the first trained and validated machine learning model may determine the importance of the anchor item to the user. For instance, the lower the acceptance rate or frequency or the higher the rejection rate or frequency, the greater the importance. Based in part on such determinations, the first trained and validated machine learning model may determine the importance of the most recently added anchor item. Further, the first trained and validated machine learning model may generate a value or score that reflects the determined importance, based in part on such determinations.

In some implementations, executed cart engine 306 may determine an importance of an anchor item based on whether the anchor item may be part of a predetermined grouping of anchor items. In some examples, the predetermined grouping may be explicit. For example, a user may explicitly indicate, via an application executing on a computing device of the user (e.g., mobile computing device 110, 112, 114), that they would like to purchase anchor items that are part of a particular recipe. Executed cart engine 306 may determine that the anchor items associated with the particular recipe (e.g., the anchor items of the explicitly grouping of anchor item), may have a significantly higher importance than anchor items that are not. In such examples, the executed cart engine 306 may generate higher scores or values of importance for anchor items associated with the predetermined grouping of anchor items than those are not.

In other examples, the predetermined grouping may be implicit. In such examples, executed cart engine 306 may apply a first trained and validated machine learning model to the extracted attribute features of each anchor item added to an electronic cart to determine whether the anchor items may be for a particular predetermined grouping of anchor items, such as a recipe. In examples where recommendation computing device 102 receives add-to-cart data 322C characterizing add-to-cart events of added anchor items as the anchor items are added to the electronic cart, executed cart engine 306 may determine that the added anchor items are part of a predetermined grouping of anchor items after enough anchor items are added to the electronic cart.

For example, executed cart engine 306 may apply the first trained and validated machine learning model to extracted attribute feature data of anchor items identified in add-to-cart data 322C characterizing add-to-cart events. At a first time period, executed cart engine 306 may obtain attribute features, such as an item description 345D, of a first anchor item "eggs" identified in add-to-cart data 322C obtained during the first time period. The add-to-cart data 322C obtained during the first time period characterizing a first add-to-cart event. At a second time period, the executed cart engine 306 may obtain attribute features of a second anchor item "milk" identified in add-to-cart data 322C obtained during the second time period. The add-to-cart data 322C obtained during the second time period characterizing a second add-to-cart event. At a third time period, the executed cart engine 306 may obtain attribute features of a third anchor item "flour" identified in add-to-cart data 322C obtained during a third time period. The add-to-cart data 322C obtained during the third time period characterizing a third add-to-cart event. As the attribute features of the anchor items are being fed into the first trained and validated machine learning model at the different time periods, the first trained and validated machine learning model may only determine that the anchor items are related to a cake recipe after receiving the attribute feature data of the third anchor item "flour." In such examples, based in part on such determinations, first trained and validated machine learning model may determine an importance of the third anchor item. Further, the first trained and validated machine learning model may generate a value or score that reflects that determined importance, based in part on such determinations.

In some examples, the one or more extracted features/data executed cart engine 306 may utilize to determine the first set of data characterizing the importance of an anchor item includes transaction data 321 of a user. For example, recommendation computing device 102 obtains, from web server 104, add-to-cart data 322C characterizing an add-to-cart event of an anchor item recently added to an electronic cart of an online platform in a current browser session initiated by a user on a computing device of the user (e.g., mobile computing device 110, 112, 114). Upon executed cart engine 306 identifying the anchor item, executed cart engine 306 may obtain transaction data 321 associated with the user. Additionally, executed cart engine 306 may apply the first trained and validated machine learning model to the transaction data 321 and data identifying the anchor item to determine a frequency at which the anchor item may have been previously purchased/ordered. Additionally, based in part on the frequency at which the anchor item may have been previously purchased/ordered, the first trained and validated machine learning model may determine a corresponding importance of the anchor item. Further, the first trained and validated machine learning model may generate a score or value that reflects the determined importance, based in part on the frequency at which the anchor item may have been previously purchased/ordered.

In some examples, recommendation computing device 102 may take into account the likelihood an anchor item recently added to an electronic cart of an online platform may go out of stock when determining the importance of the anchor item. In such examples, the one or more extracted features/data executed cart engine 306 may utilize. to determine the first set of data, includes OOS data 332. For example, recommendation computing device 102 obtains, from web server 104, add-to-cart data 322C characterizing an add-to-cart event of an anchor item recently added to an electronic cart of an online platform in a current browser session initiated by a user on a computing device of the user (e.g., mobile computing device 110, 112, 114). Additionally, recommendation computing device 102, obtains, from web server 104, a pickup request for the anchor item. The pickup request including data characterizing a pickup event request for the anchor item at store 109. Executed cart engine 306 identifying the anchor item and the store ID of store 109, executed cart engine 306 may obtain extracted features for determining an importance of anchor item to the user, such as acceptance data 331C, along with OOS data 332 associated with the anchor item and store 109. Executed cart engine 306 may apply a first trained and validated machine learning model to the obtained extracted features and the OOS data 332 to determine the importance of the anchor item to the users. In some instances, the greater the likelihood the anchor item will go out of stock in store 109 at a future time interval (e.g., during fulfillment), the greater the importance of the anchor item to the user. Based in part on the determined likelihood the anchor item will go out of stock in store 109 at the future time interval, the first trained and validated machine learning model may generate a value or score that reflects the determined importance.

In some implementations, operations to generate output data 329 may include determining and generating a second set of data characterizing a likelihood of an occurrence of a substitution item rejection event of an anchor item identified in a current browser session initiated by a user on a computing device of the user (e.g., mobile computing device 110, 112, 114). As described herein, the substitution item rejection event occurs when the user rejects all recommended substitution items identified for a particular anchor item. In such implementations, recommendation computing device 102 may implement a second set of operations that generate a second set of data characterizing the likelihood of an occurrence of the substitution item rejection event of the anchor item. In some examples the data may include a score or value indicating the likelihood of an occurrence of the substitution item rejection event of the anchor item. In other examples, the second set of operations may be based on one or more of the extracted features/data. Additionally, recommendation computing device 102 may execute rejection engine 312 may implement the second set of operations. Further, executed rejection engine 312 may apply a second trained and validated machine learning model, such as an ensemble or decision tree process (e.g., a gradient boosted decision tree process, such as a XGBoost model), to one or more of the extracted features/data to determine and generate second set of data characterizing the likelihood of an occurrence of the substitution item rejection event of the anchor item.

In various implementations, executed rejection engine 312 may perform operations that adaptively train a second machine-learning or artificial-intelligence process to determine the likelihood of an occurrence of the substitution item rejection event of an anchor item. The anchor item being identified in a current browser session initiated by a user on a computing device of the user (e.g., mobile computing device 110, 112, 114) to the user. Additionally, executed rejection engine 312 adaptively trains the second machine-learning or artificial-intelligence process using training datasets associated with a first prior temporal interval (e.g., a "training" interval), and validates the trained second machine-learning or artificial-intelligence process using validation datasets associated with a second, and distinct, prior temporal interval. In various implementations, the training dataset may be obtained from the extracted substitution data 323, acceptance data 325, substitution rejection data 327, anchor item attribute feature data 328, transaction data 321, inventory data 331B and OOS data 332. Additionally, the obtained data elements of the extracted substitution data 323, acceptance data 325, substitution rejection data 327, anchor item attribute feature data 328, transaction data 321, inventory data 331B and OOS data 332, may be of a first prior temporal interval. In other implementations, validation dataset may be obtained from the extracted substitution selection data 321A and substitution selection data 322D. Further, the obtained elements of the extracted substitution selection data 321A and substitution selection data 322D, may be of a second and distinct prior temporal interval. Once the second machine learning model is trained and validated, executed cart engine 306 may store the trained and validated second machine learning model in machine learning model database 350.

In some examples, the one or more extracted features/data executed cart engine 306 may utilize, to determine the second data set characterizing the likelihood of an occurrence of a substitution rejection event associated with an anchor item, includes substitution data 323 and extracted acceptance data 325 and/or substitution rejection data 327. For example, recommendation computing device 102 obtains, from web server 104, add-to-cart data 322C characterizing an add-to-cart even of an anchor item recently added to an electronic cart of an online platform in a current browser session initiated by a user on a computing device of the user (e.g., mobile computing device 110, 112, 114).

Upon executed rejection engine 312 identifying the anchor item, executed rejection engine 312 may obtain extracted acceptance data 325 and/or substitution rejection data 327 associated with the user, as well as substitution data 323 associated with the identified anchor item. In some examples, the substitution data 323 may characterize one or more substitution items that may replace the anchor item, along with relevance scores. Additionally, the relevance scores may indicate a replacement suitability of the particular substitution item for the anchor item. Further, the acceptance data 325 and/or substitution rejection 327 data may characterize a frequency or rate at which the user accepts or rejects the substitution items identified in the substitution data. Based in part on the rate or frequency of rejection or acceptance, the second trained and validated machine learning model may determine the likelihood of the occurrence of a substitution rejection event of the substitution items identified in the substitution data. For instance, the lower the acceptance rate or frequency or the higher the rejection rate or frequency, the greater the likelihood of the substitution rejection event. Further, the second trained and validated machine learning model may generate a value or score that reflects the determined likelihood based in part on the rate or frequency of rejection or acceptance.

In various implementations, if the user does not have the acceptance data or substitution rejection data of a particular substitution item and anchor item combination, executed rejection engine 312 may utilize obtain acceptance data 325 and/or substitution rejection data 327 of the particular substitution item and anchor item combination of other users. In some examples, executed user attribute engine 310 may, for each substitution item and anchor item combination, aggregate the acceptance data 325 of each user of the online platform. Additionally, executed user attribute engine 310 may generate, for each substitution item and anchor item combination, global acceptance data based on the aggregated acceptance data 325. The executed rejection engine 312 may utilize, for a particular user lacking acceptance data of a particular substitution item and anchor item combination, the global acceptance data of the particular substitution item and anchor item combination.

In other examples, executed user attribute engine 310 may, for each substitution item and anchor item combination, aggregate the substitution rejection data 327 of each user. Additionally, executed user attribute engine 310 may generate, for each substitution item and anchor item combination, global substitution rejection data based on the aggregated substitution rejection data 327. The executed rejection engine 312 may utilize, for a particular user lacking substitution rejection data of a particular substitution item and anchor item combination, the global substitution rejection data of the particular substitution item and anchor item combination.

In some examples, the one or more extracted features/data executed rejection engine 312 may utilize, includes relevance score data of the substitution data 323 associated with a particular anchor item. For example, recommendation computing device 102 obtains, from web server 104, add-to-cart data 322C characterizing an add-to-cart event of an anchor item recently added to an electronic cart of an online platform in a current browser session initiated by a user on a computing device of the user (e.g., mobile computing device 110, 112, 114). Upon executed rejection engine 312 identifying the anchor item, executed rejection engine 312 may obtain substitution data 323 corresponding to the anchor item. Additionally, executed extraction engine 304 may extract the relevance scores data associated with each substitution item. Moreover, executed rejection engine 312 may obtain the relevancy score data of each substitution item and apply a second trained and validated machine learning model to the extracted relevance scores of each substitution item to determine the likelihood of an occurrence of a substitution rejection event. For example, the greater the average relevance scores are, the lower the likelihood of an occurrence of a substitution rejection event. Based in part on the relevance scores of the substitution items, second trained and validated machine learning model may determine the likelihood of an occurrence of a substitution rejection event associated with the anchor item. Further, the second trained and validated machine learning model may generate a value or score that reflects the determined importance based in part on the relevance scores of the substitution items.

In some examples, the one or more extracted features/data executed rejection engine 312 may utilize, to determine the second set of data, includes extracted attribute features of substitute items (e.g., extraction engine 304 may extract attribute feature data of substitute items identified in substitution data 323 of an anchor item, based on from catalog data 345 and substitute data 323 associated with the identified anchor item) associated with an anchor item identified in a current browser session initiated by a user on a computing device of the user (e.g., mobile computing device 110, 112, 114). For example, based on the attribute feature data of the substitute items associated with the identified anchor item and the anchor item attribute feature data 328 of the identified anchor item, executed rejection engine 312 may apply the attribute features (e.g., item description) of the substitutes items and the attribute features (e.g., item description) of the anchor item to the second trained and validated machine learning model. Second trained and validated machine learning model may determine how similar the substitute items may be to the associated anchor item. Based in part on the determined similarities or differences, the second trained and validated machine learning model may generate second set of data characterizing the likelihood of the occurrence of a substitution rejection event. For example, the greater the similarities, the lower the likelihood. Further, the second trained and validated machine learning model may generate a score or value indicating the likelihood of the occurrence of the substitution rejection event based in part on the determined similarities or differences.

In some examples, the one or more extracted features/data executed rejection engine 312 may utilize, to determine the second set of data, includes inventory data 331B associated with substitution items associated with the anchor item. For example, recommendation computing device 102 obtains, from web server 104, add-to-cart data 322C of an add-to-cart event. The add-to-cart event may identity an anchor item added to an electronic cart of an online platform at their corresponding time intervals in a current browser session initiated by a user on a computing device of the user (e.g., mobile computing device 110, 112, 114). Additionally, recommendation computing device 102, obtains, from web server 104, a pickup request for the anchor item. The pickup request including data characterizing a pickup event request for the anchor item at store 109. Upon executed rejection engine 312 identifying the anchor item and the store ID of store 109, executed rejection engine 312 may obtain substitute data 323 associated with the anchor item and inventory data 331B associated with store 109 and each substitute item identified in the substitute data, received purchase order data 331D associated with each substitute item and store 109, OOS data 332 associated with each substitute item and store 109 and/or historical out of stock data associated with store 109 and each substitute item, along with extracted relevancy scores of each substitute item. Executed rejection engine 312 may apply a second trained and validated machine learning model to the inventory data 331B associated with store 109 and each substitute item identified in the substitute data 323, received purchase order data 331D associated with each substitute item and store 109, OOS data 332 associated with each substitute item and store 109 and/or historical out of stock data associated with store 109 and each substitute item, along with extracted relevancy scores of each substitute item, to determine the likelihood of an occurrence of a substitution rejection event of the anchor item.

For example, the second trained and validated machine learning model may determine the likelihood the substitute items may be out of stock at a future time interval when the anchor item may be fulfilled, based on the inventory data 331B associated with store 109 and each substitute item identified in the substitute data 323, received purchase order data 331D associated with each substitute item and store 109 and/or historical out of stock data associated with store 109 and each substitute item. Additionally, for the substitution items that are determined to have a greater likelihood of being out of stock at the future time interval, their corresponding relevancy scores may impact the second trained and validated machine learning model's determination of the likelihood of an occurrence of a substitution rejection event. For instance, the higher the relevancy score for a substitute item that is likely to be out of stock at the future time interval, the greater the likelihood of the occurrence of the substitution rejection event.

In various implementations, recommendation computing device 102 may execute combiner engine 314 to determine and generate the output data 329 by utilizing a first set of data characterizing the importance of an anchor item data identified from a current browser session, and/or a second set of data characterizing the likelihood an occurrence of a substitution rejection event of the anchor item. In such implementations, execute combiner engine 314 may combine the first set of data and/or the second set of data to generate output data 329. Output data 329 may include a notification value for the anchor item. Additionally, the notification value may characterize a likelihood of an occurrence of a substitution item rejection event of the anchor item and/or an importance of the anchor item to the particular user. In various implementations, executed combiner engine 314 may store output data 329 of each anchor item in user database 320.

In some implementations, executed combiner engine 314 may utilize a simple multiplication combiner to combine the first set of data characterizing the importance of the anchor item data and/or the second set of data characterizing the likelihood an occurrence of the substitution rejection event of the anchor item. In other implementations, executed combiner engine 314 may utilize a cohort based combiner to combine the first set of data characterizing the importance of the anchor item data and/or the second set of data characterizing the likelihood an occurrence of the substitution rejection event of the anchor item. In yet other implementations, executed combiner engine 314 may utilize a trained and validated neural network based machine learning model to combine the first set of data characterizing the importance of the anchor item data and/or the second set of data characterizing the likelihood an occurrence of the substitution rejection event of the anchor item.

Output data 329 may be utilized by recommendation computing device 102 to determine whether to cause an application executing on a computing device (e.g., mobile computing device 110, 112, 114) of a user to generate and present a substitution item notification. In some implementations, recommendation computing device 102 may execute notification engine 316 to determine whether to cause an application executing on a computing device (e.g., mobile computing device 110, 112, 114) of a user to generate and present a substitution item notification, based on the output data 329 of an anchor item. For example, if the notification value of output data 329 of a particular anchor item is above or equal to a particular threshold value, executed notification engine 316 may generate and transmit substitution notification data to the computing device of the user. The substitution notification data may include instructions indicating which substitute items are to have corresponding content presented on the substitution item notification. The application executing on the computing device of the user may execute the instructions of the substitution notification data to generate and present a substitution item notification with content related to the anchor item as indicated in the instruction.

In some implementations, the instructions included in the substitution item notification may be based in part on the relevance scores of the substitute items. For example, upon determining that the notification value of a particular anchor item is equal to or above a threshold value, executed notification engine 316, may obtain, substitute data 323 associated with the anchor item. The substitute data 323 may identify one or more substitute items associated with the anchor item, along with relevance score data. The relevance score data may indicate a replacement suitability for the anchor item. Based on the relevance score data of the one or more substitute items, executed notification engine 316 may generate substitution item notification data with instructions indicating that the application executing on the computing device of the user sort the content items associated with each substitute item of the anchor item by corresponding relevance scores (e.g., content items of the substitute items sorted in descending order with the content item of substitute item with highest relevancy score is to be presented first).

In various implementations, the instructions included in the substitution item notification data may be further based on the availability of the substitute items. Following the example above, executed notification engine 316 may further obtain inventory data 331B of the one or more substitute items associated with the anchor item, in response to executed notification engine 316 determining that the notification value of a particular anchor item is equal to or above a threshold value. Additionally, executed notification engine 316 may generate substitution item notification data with instructions based further on the inventory data. In some examples, executed notification engine 316 may generate substitution item notification data with instructions that cause the application executing on the computing device of the user to present content items of substitute items that are available. Further, in other examples, executed notification engine 316 may obtain OOS data 332 of the substitution items of the anchor item. In such examples, based on the OOS data 332, recommendation computing device 102 may generate substitution notification data with instructions that cause application executing on the computing device of the user to present content items of substitute items that are available in a future time interval (e.g., during fulfillment of the corresponding order).

In other implementations, the instructions included in the substitution item notification data may be also based on predetermined parameter data. In some examples, the predetermined parameter data may define a limit to the amount and type of content to be presented on the substitution item notification. Additionally, the predetermined parameter data may further define the parameters related to the look and structure of the notification. In various implementations, the predetermined parameter data may be based on the computational resources of the computing device of the user that is to be generating and presenting the substitution item notification. In other implementations, the predetermined parameters may be defined by an operator of recommendation computing device 102.

For example, executed notification engine 316 may further obtain predetermined parameter data, in response to executed notification engine 316 determining that the notification value of a particular anchor item is equal to or above a threshold value. Additionally, executed notification engine 316 may generate substitution notification data with instructions based further on the predetermined parameter data. In some examples, executed notification engine 316 may generate substitution notification data with instructions that cause the application executing on the computing device of the user to generate and present content items of substitute items in accordance to the parameters indicated in the predetermined parameter data. For instance, the parameters may indicate a predetermined number of substitute item related content items are to be generated and presented. Executed notification engine 316 may generate the instruction of the substitute item notification data that limits the number of substitute item related content items on the generated substitution item notification to a predetermined number. The application executing on the computing device may execute such instructions and generate the substitution item notification with the predetermined number of substitute item related content items.

Following the examples above, the instructions of the substitute item notification data may indicate that the substitute item related content items of the substitute item notification be sorted by corresponding relevancy scores and be limited by a predetermined number of substitute item related content items, such as five. As such, based on the instructions of the substitute item notification data, the application executing on the computing device of the user may generate and present substitute item related content items of the top five substitute items with the substitute item related content items being sorted in descending order with the substitute item related content item of substitute item with highest relevancy score being presented first or at the top of the user interface. In various examples, the substitute item related content items may only be of available substitute items, if the instructions were further based on the availability data of the substitute items.

Methodology

Figure 4:
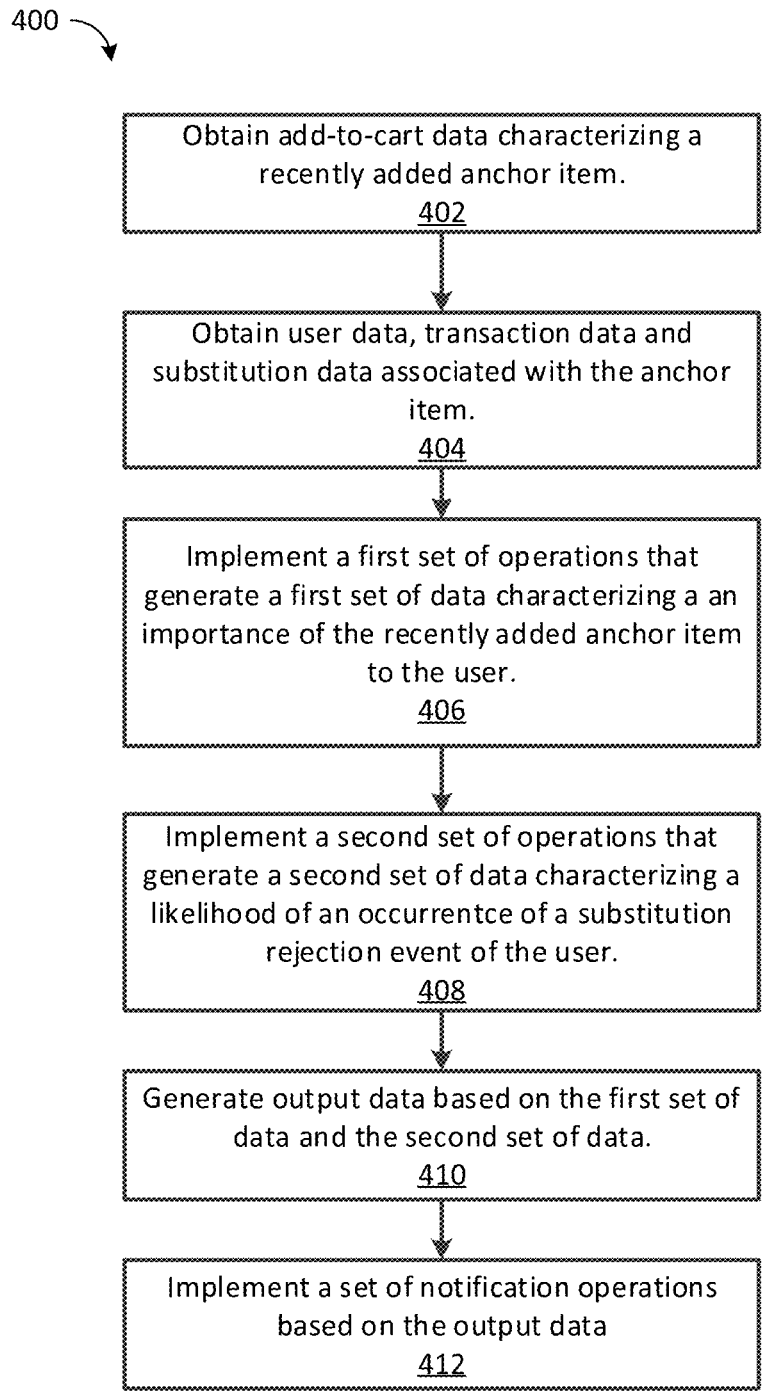
FIG. 4 illustrates an example method that can be carried out by the recommendation computing device 102 of FIG. 1.

FIG. 4 illustrates an example method that can be carried out by the recommendation computing device 102 of FIG. 1. In describing an example method of FIGS. 4, 6, 7 and 8, reference is made to elements of FIG. 1-3 for purpose of illustrating a suitable component for performing a step or sub-step being described.

With reference to example method 400 of FIG. 4, recommendation computing device 102 may, obtain add-to-cart data characterizing a recently added anchor item (402). In some examples, recommendation computing device 102 may obtain, from a computing device of a user of a plurality of users, add-to-cart data characterizing a recently added anchor item that has been added to a set of anchor items and the set of anchor items. In other examples, recommendation computing device 102 may obtain the add-to-cart data during a current browser session initiated by the user on the computing device of the user.

Figure 5:
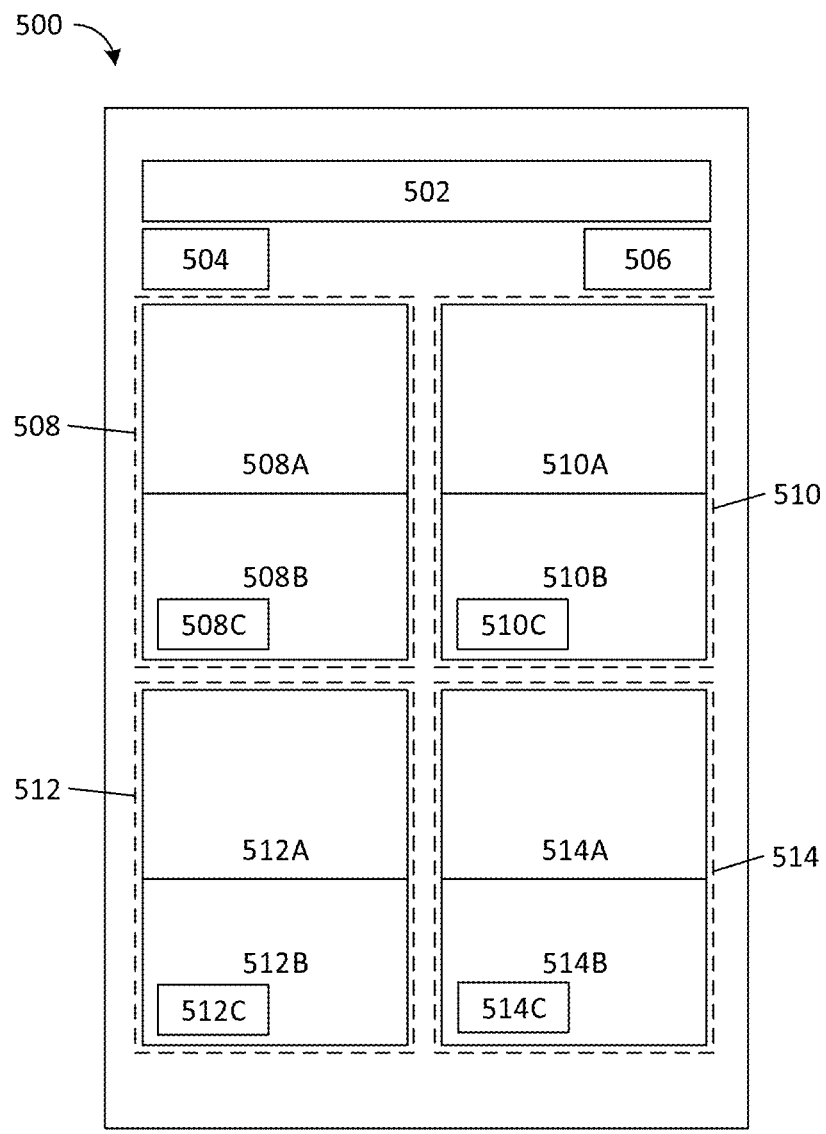
FIG. 5 illustrates an example user interface (UI)

In various implementations, a user may execute an application on a computing device (e.g., mobile computing device 110, 112, 114) that generates a user interface that enables the user to add anchor items to an electronic cart of an online platform. FIG. 5 illustrates an example user interface (UI) 500 generated on a computing device of a user that enables the user to add anchor items to an electronic cart. As illustrated in FIG. 5, UI 500 may include a search bar 502 that may enable a user to input a search query for anchor items. UI 500 may also include graphical feature 504 and graphical feature 506. In various examples, after a user submits a search query in search bar 502, graphical feature 504 may display content identifying the number of search results based on the search query. Additionally, graphical feature 506 may be a selectable feature that enables the user to change filtering and sorting parameters related to how the returned search results are presented. Moreover, UI 500 may include content (e.g., content 508, 510, 512, 514) of each search result entry. In various examples, the content (e.g., content 508, 510, 512, 514) may include anchor-item related content of each search result. For example, a user may submit a search query "strawberry yogurt" via search bar 502. As such, UI 500 may present a search result stemming from the search query "strawberry yogurt," including content for various types of yogurt. For instance, UI 500 may include content of multiple search results entries all related to "strawberry yogurt" (e.g., content 508 of a first search result entry man include anchor-item content related to a first brand of strawberry yogurt; content 510 of a second search result entry man include anchor-item content related to a second brand of strawberry yogurt; content 512 of a third search result entry man include anchor-item content related to a third brand of strawberry yogurt; and content 514 of a fourth search result entry man include anchor-item content related to a fourth brand of strawberry yogurt).

Additionally, content of each search result entry (e.g., content 508, 510, 512, and 514), may include content items or graphical elements (e.g., graphical element 508A, 508B, 510A, 510B, 512A, 512B, 514A and 514B) associated with the related anchor item. In some examples, the graphical element may be a picture of the related anchor item (e.g., graphical element 508A, 510A, 512A and 514A may be a picture of the related strawberry yogurt anchor item). In other examples, the graphical element may be an item description of the related anchor item (e.g., graphical element 508B, 510B, 512B and 514B may be an item description of the related strawberry yogurt anchor item). Moreover, content of each search result entry (e.g., content 508, 510, 512, and 514), may include selectable or interactive graphical elements (e.g., interactive graphical element 508C, 510C, 512C and 514C) associated with the related anchor item. The interactive graphical element of each content may, when selected, enable the user to add the corresponding anchor item to an electronic cart of an online platform. For example, user may, through a touch screen display of their mobile computing device (e.g., mobile computing device 110, 112, 114) select interactive graphical element 514C to add the corresponding strawberry yogurt anchor item to an electronic cart. In various examples, in response to the user adding the anchor item (e.g., the strawberry yogurt associated with graphical element 514C) to the electronic cart, the corresponding application may transmit corresponding add-to-cart data (e.g., add-to-cart data 322C) to recommendation computing device 102.

Figure 7:
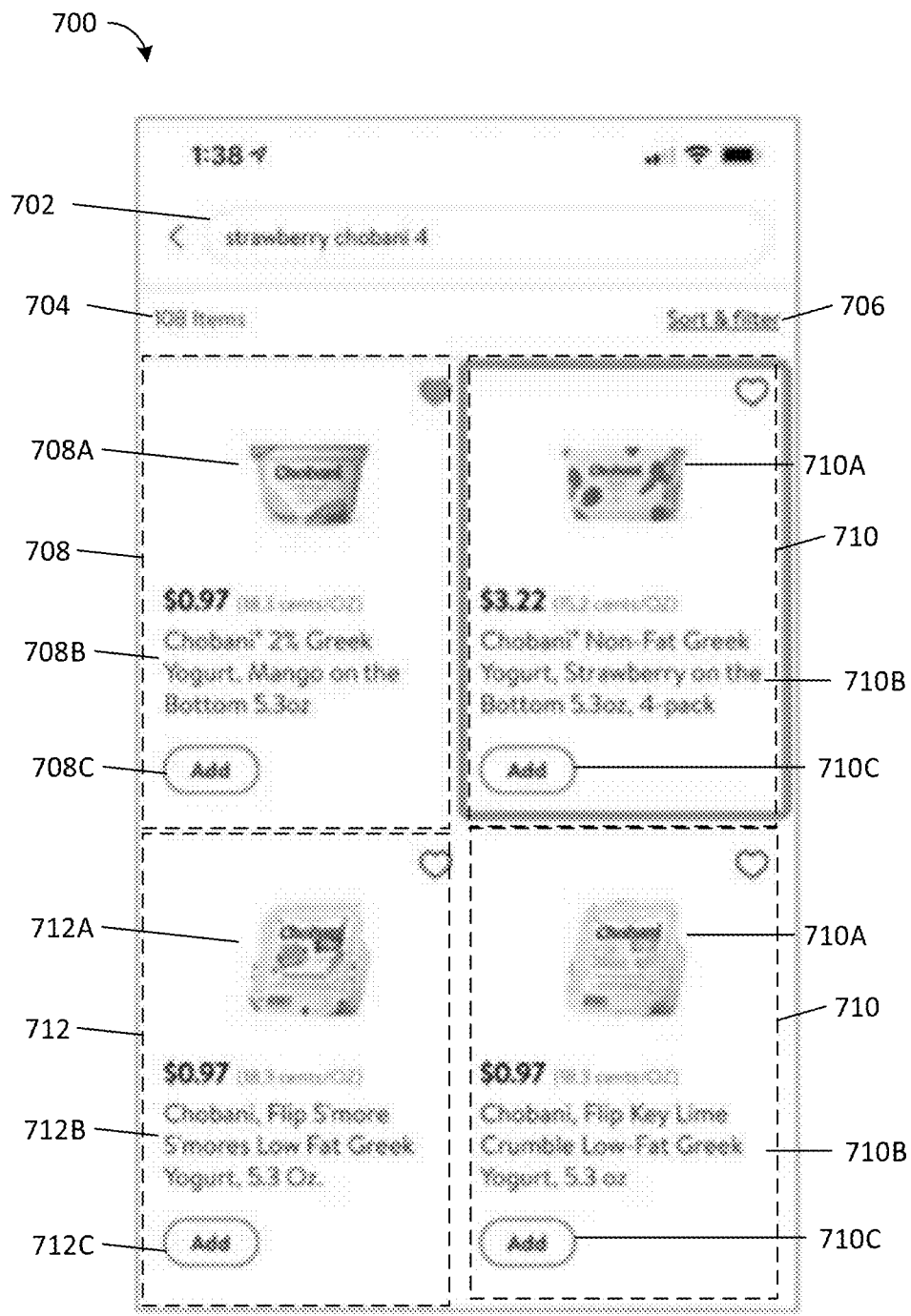
FIG. 7 illustrates an example embodiment of UI 500.

FIG. 7, illustrates an example embodiment of example UI 500. As illustrated in FIG. 7, UI 700 may include content, content items, features, and/or graphical elements similar to those described for UI 500. For example, UI 700 may include a search bar 702 similar to search bar 502 of FIG. 5. Additionally, UI 700 may include graphical features 704 and 706 similar to the graphical features 504 and 506 of FIG. 5, respectively. Moreover, UI 700 may include content, such as content 708, 710, 712, 714, similar to the content 508, 510, 512 and 514 of FIG. 5, respectively. Further, the content of UI 700 (e.g., content 708, 710, 712, 714) may each include content items or graphical items, such as graphical element 708A, 708B, 710A, 710B, 712A, 712B, 714A and 714B, similar to the graphical elements 508A, 508B, 510A, 510B, 512A, 512B, 514A and 514B of FIG. 5, respectively. In various examples, each content of UI 700 (e.g., content 708, 710, 712, 714) may include selectable or interactive graphical elements, such as interactive graphical elements 708C, 710C, 712C and 714C, similar to the interactive graphical elements 508C, 510C, 512C and 514C of FIG. 5, respectively.

Referring back to FIG. 4, recommendation computing device 102 may obtain user data associated with the user of the first computing device, transaction data associated with the user of the first computing device, and substitution data associated with the anchor item (404). Additionally, recommendation computing device 102 may implement a first set of operations that generate a first set of data characterizing an importance of the recently added anchor item (406). In some examples, the first set of operations may be based at least on the add-to-cart data obtained during the current browser session, the user data of the user and the transaction data.

In some implementations, the operations to generate the output data 329 may include determining and generating a first set of data characterizing the importance of an anchor item identified in a current browser session initiated by a user on a computing device of the user (e.g., mobile computing device 110, 112, 114). In such implementations, recommendation computing device 102 may implement a first set of operations that generate a first set data characterizing an importance of the anchor item data. In some examples first set of the data may include a score or value indicating the importance of the anchor item data. In other examples, the first set of operations may be based on one or more of the extracted features/data. Additionally, recommendation computing device 102 may execute cart engine 306 to implement the first set of operations. Further, executed cart engine 306 may apply a first trained and validated machine learning model (e.g., a logistic regression model) to one or more of the extracted features/data to determine and generate first set of data characterizing the importance of an anchor item identified in a current browser session initiated by a user on a computing device of the user (e.g., mobile computing device 110, 112, 114). In some examples, the first set of data may include a score or value that reflects the determined importance (e.g., the higher the value/score, the greater the importance).

In some examples, the importance of an anchor item may be defined by the likelihood that the unavailability of the anchor item would result in a cancellation event. A cancellation event may indicate a cancellation of a purchase order in response to a notification that one or more anchor items of the purchase order is unavailable. Additionally, a cancellation event may include browser sessions that terminated before a user initiated "checkout" procedures on the application executing on a computing device of the user (either due to the user logging out or the browser session timing out) and after the user selected an unavailable anchor item. Further, recommendation computing device 102 may store in data repository 116, cart break data within a corresponding data repository 116, such as cart break data.

Further, recommendation computing device 102 may implement a second set of operations that generate a second set of data characterizing a likelihood of an occurrence of a substitution rejection event of the user (408). In some examples, the second set of operations may be based at least on the add-to-cart data, the user data of the user, and the substitution data of the anchor item.

In some implementations, the operations to generate the output data 329 may include determining and generating second set of data characterizing a likelihood of an occurrence of a substitution item rejection event of an anchor item identified in a current browser session initiated by a user on a computing device of the user (e.g., mobile computing device 110, 112, 114). As described herein, the substitution item rejection event occurs when the user rejects all recommended substitution items identified for a particular anchor item. In some examples the second set of data may include a score or value indicating the likelihood of an occurrence of the substitution item rejection event of the anchor item. In other examples, the second set of operations may be based on one or more of the extracted features/data. Additionally, recommendation computing device 102 may execute rejection engine 312 may implement the second set of operations. Further, executed rejection engine 312 may apply a second trained and validated machine learning model, such as an ensemble or decision tree process (e.g., a gradient boosted decision tree process, such as a XGBoost model), to one or more of the extracted features/data to determine and generate a second set of data characterizing the likelihood of an occurrence of the substitution item rejection event of the anchor item.

Recommendation computing device 102 may generate output data 329 based on the first set of data and the second set of data (410). In various implementations, recommendation computing device 102 may execute combiner engine 314 to determine and generate the output data 329 by utilizing first set of data characterizing the importance of an anchor item data identified from a current browser session, and/or second set of data characterizing the likelihood an occurrence of a substitution rejection event of the anchor item. In such implementations, execute combiner engine 314 may combine the first set of data characterizing the importance of the anchor item data and/or the second set of data characterizing the likelihood an occurrence of the substitution rejection event of the anchor item to generate output data 329. Output data 329 may include a notification value for the anchor item. Additionally, the notification value may characterize a likelihood of an occurrence of a substitution item rejection event of the anchor item and/or an importance of the anchor item to the particular user. In various implementations, executed combiner engine 314 may store output data 329 of each anchor item in user database 320.

In some implementations, executed combiner engine 314 may utilize a simple multiplication combiner to combine the first set of data characterizing the importance of the anchor item data and/or the second set of data characterizing the likelihood an occurrence of the substitution rejection event of the anchor item. In other implementations, executed combiner engine 314 may utilize a cohort based combiner to combine the first set of data characterizing the importance of the anchor item data and/or the second set of data characterizing the likelihood an occurrence of the substitution rejection event of the anchor item. In yet other implementations, executed combiner engine 314 may utilize a trained and validated neural network based machine learning model to combine the first set of data characterizing the importance of the anchor item data and/or the second set of data characterizing the likelihood an occurrence of the substitution rejection event of the anchor item.

Recommendation computing device 102 may implement a set of notification operations based on the output data 329 (412). In various examples, the set of notification operations may include determining whether to cause an application executing on a computing device (e.g., mobile computing device 110, 112, 114) of a user to generate and present a substitution item notification, based on the output data 329 of an anchor item and a threshold value. For example, if the notification value of the output data of a particular anchor item is above or equal to a particular threshold value, executed notification engine 316 may generate and transmit substitution item notification data to the computing device of the user. The substitution notification data may include instructions indicating which substitute items are to have corresponding content presented on the substitution item notification. The application executing on the computing device of the user may execute the instructions of the substitution notification data to generate and present a substitution item notification with content related to the anchor item as indicated in the instruction.

Figure 6:
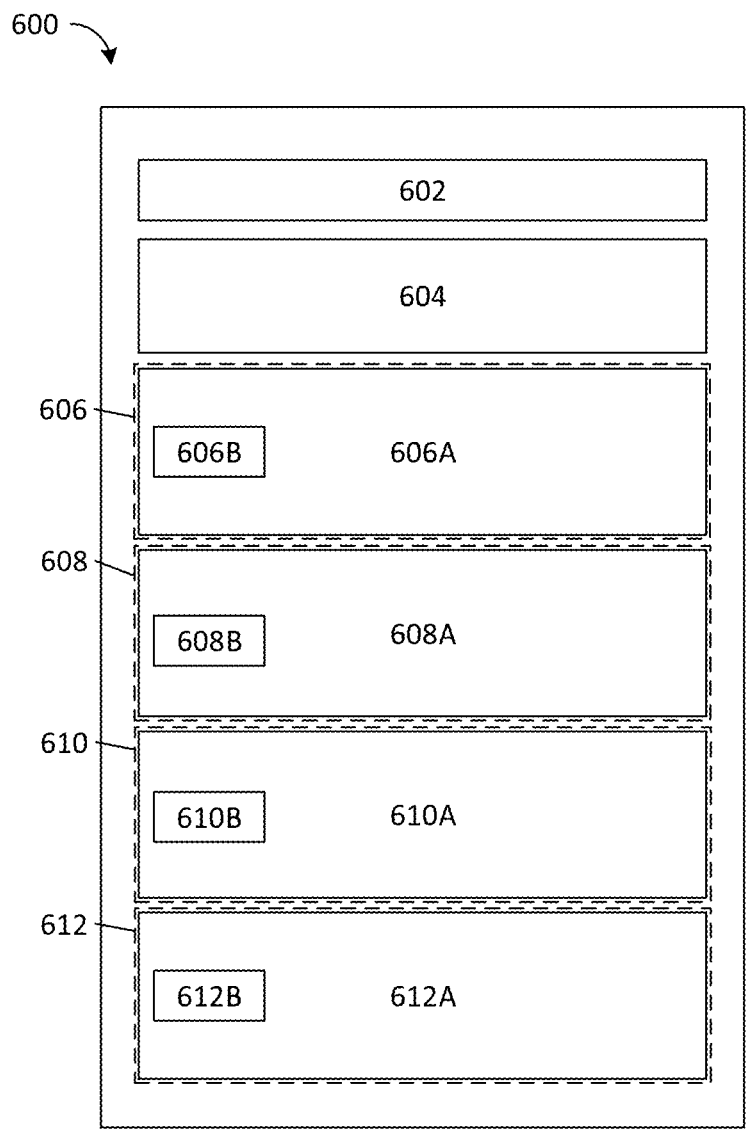
FIG. 6 illustrates an example UI.

FIG. 6 illustrates a UI with a substitution item notification generated and presented in response to the corresponding computing device of the user (e.g., mobile computing device 110, 112, 114) executing the substitution item notification. As illustrated in FIG. 6, UI 600 may include graphical element 602 and 604. Graphical element 602 may include content indicating UI 600 is related to substitution item selection of an anchor item, while graphical element 604 may include content related to the anchor item. In some examples, the content related to the anchor item may indicate to the user that the selection of the substitution item will only be used to replace the anchor item, if the anchor item is unavailable during fulfillment.

UI 600 of FIG. 1, may also include content items (e.g., content items 606, 608, 610 and 612) related to the substitution items associated with the anchor item. The content items (e.g., content items 606, 608, 610 and 612) may include graphical elements (e.g., graphical elements 606A, 608A, 610A, and 612A) that may include an item description of the corresponding substitute item. Additionally, the content items (e.g., content items 606, 608, 610 and 612) may include a selectable or interactive graphical element (e.g., interactive graphical element 606B, 608B, 610B, 612B). The interactive graphical element of each content item may, when selected, enable the user to indicate that the corresponding substitute item can be used to replace the anchor item, if the anchor item is unavailable at a future time interval (e.g., at fulfillment. For example, following the previous examples, the user may have added an anchor item related to a particular brand or type of strawberry yogurt to the electronic cart of the online platform. Additionally, recommendation computing device 102 may determine that an output data 329 associated with the anchor item includes a notification value greater than the threshold value. The anchor item being identified from add-to-cart data 322C characterizing a recent add-to-cart event of the anchor item. As such, recommendation computing device 102 may cause an application executing on computing device of the user (e.g., mobile computing device 110, 112, 114) to present a UI similar to UI 600. UI 600 may include content items of substitution items associated with the anchor item related to a particular brand or type of strawberry yogurt. Upon the user selecting, through a touch screen display of their mobile computing device (e.g., mobile computing device 110, 112, 114), interactive graphical element 608B, the corresponding application may generate and transmit replacement data. The replacement data may indicate the substitution item corresponding to interactive graphical element 608B is a user selected replacement to the anchor item related to the particular brand or type of strawberry yogurt, if at a future time interval (e.g., during fulfillment) the anchor item related to the particular brand or type of strawberry yogurt is unavailable.

Figure 8:
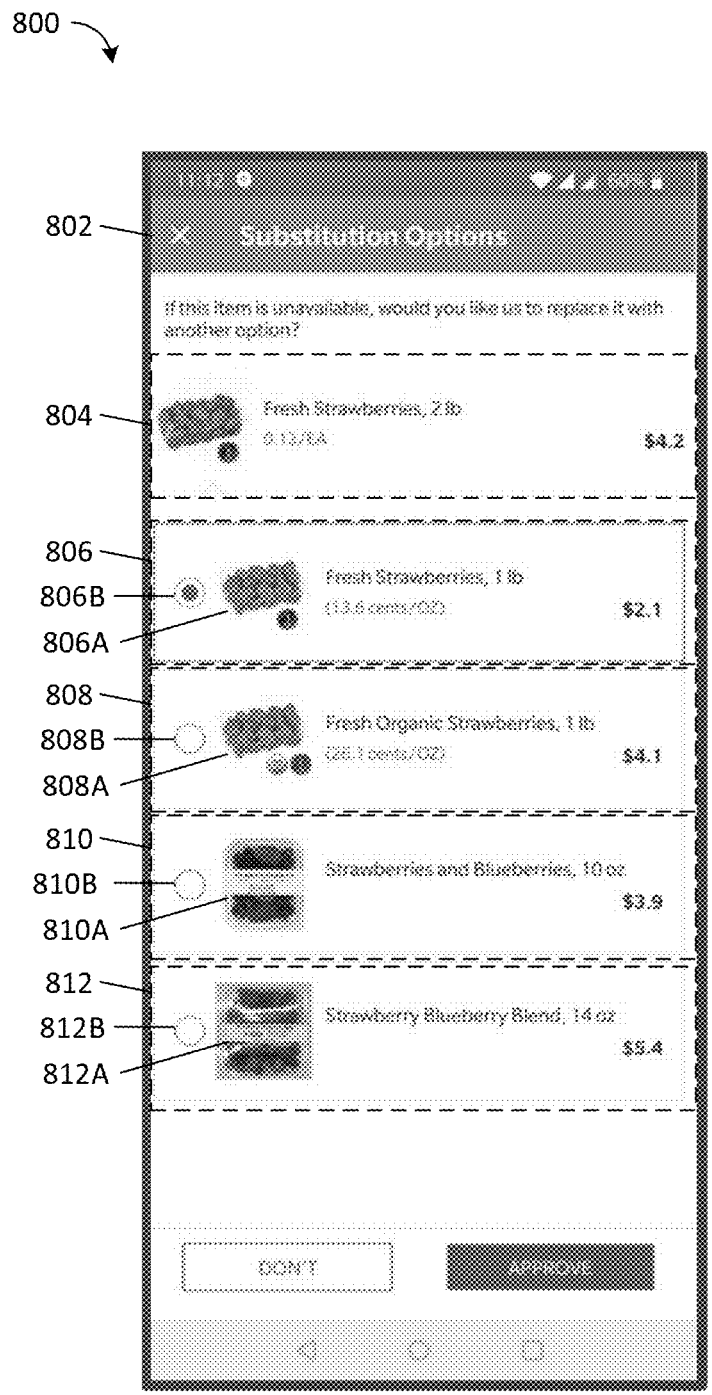
FIG. 8 illustrates an example embodiment of UI 600.

FIG. 8, illustrates an example embodiment of example UI 600. As illustrated in FIG. 8, UI 800 may include content, content items, features, and/or graphical elements similar to those described in UI 600. For example, UI 800 may include graphical features 802 and 804 similar to the graphical features 602 and 604 of FIG. 6, respectively. Moreover, UI 600 may include content items, such as content items 806, 808, 810 and 812, similar to the content 606, 608, 610 and 612 of FIG. 6, respectively. Further, the content items of UI 800 (e.g., content items 806, 808, 810 and 812) may each include graphical elements, such as graphical element 806A, 808A, 810A, and 812A, similar to the graphical elements 606A, 608A, 610A, and 612A of FIG. 6, respectively. In various examples, each content of UI 800 (e.g., content 708, 710, 712, 714) may include selectable or interactive graphical elements, such as interactive graphical elements 806B, 808B, 810B, and 812B, similar to the interactive graphical elements 606B, 608B, 610B, and 612B of FIG. 6, respectively.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The term model as used in the present disclosure includes data models created using machine learning. Machine learning may involve training a model in a supervised or unsupervised setting. Machine learning can include models that may be trained to learn relationships between various groups of data. Machine learned models may be based on a set of algorithms that are designed to model abstractions in data by using a number of processing layers. The processing layers may be made up of non-linear transformations. The models may include, for example, artificial intelligence, neural networks, deep convolutional and recurrent neural networks. Such neural networks may be made of up of levels of trainable filters, transformations, projections, hashing, pooling and regularization. The models may be used in large-scale relationship-recognition tasks. The models can be created by using various open-source and proprietary machine learning tools known to those of ordinary skill in the art.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a memory resource storing instructions; and
one or more processors coupled to the memory resource, the one or more processors being configured to execute the instructions to:
during a current browser session, obtain, from a first computing device of a user of a plurality of users, add-to-cart data characterizing a set of anchor items and an indication of a most recently added anchor item;
obtain, from a database, (i) user data associated with the user, (ii) transaction data associated with the user, and (iii) substitution data associated with the most recently added anchor item;
based at least on the add-to-cart data obtained during the current browser session, the user data of the user and the transaction data of the user, implement a first set of operations that generate a first set of data characterizing an importance of the most recently added anchor item to the user, wherein the first set of operations includes comparing attribute features of the most recently added anchor item to the attribute features of anchor items of previous add-to-cart events, wherein the attribute features comprise at least: item brand, item type, item description and item price;
based at least on the add-to-cart data, the user data of the user, and the substitution data of the most recently added anchor item, implement a second set of operations that generate a second set of data characterizing a likelihood of an occurrence of a substitution rejection event associated with the user;
generate output data based on the first set of data and the second set of data; and
implement a set of notification operations based on the output data.

2. The system of claim 1, wherein execution of the instructions, by the one or more processors, further causes the one or more processors to implement the set of notification operations based on the output data by:
determining the output data is greater than a threshold value; and
in response to determining the output data is greater than the threshold value, cause an application executing on the first computing device of the user to generate and present a notification.

3. The system of claim 2, wherein the substitution data associated with the most recently added anchor item characterizes one or more substitution items, and wherein in response to determining the output data is greater than the threshold value, further cause, by the one or more processors, the application executing on the first computing device of the user to generate a graphical representation of each of the one or more substitution items, along with a selectable feature, that when engaged with, causes the application to generate replacement data indicating a selected one of the one or more substitution items.

4. The system of claim 1, wherein generating the output data includes combining the first set of data and the second set of data.

5. The system of claim 1, wherein the set of notification operations includes:
based on the user data, obtaining preference data characterizing one or more item substitution preferences associated with the most recently added anchor item; and
generating substitution item notification data based in part on the preference data.

6. The system of claim 5, wherein execution of the instructions, by the one or more processors, further causes the one or more processors to implement the set of notification operations based on the output data by:
determining the output data is greater than a threshold value; and
in response to determining the output data is greater than the threshold value, transmit the substitution item notification data to the first computing device of the user.

7. The system of claim 1, wherein the user data includes engagement data, transaction data, acceptance data and feedback data.

8. The system of claim 1, wherein execution of the instructions, by the one or more processors, further causes the one or more processors to:
implement a third set operations that generate OOS data characterizing a likelihood the most recently added anchor item will be out of stock in a future time interval.

9. The system of claim 1, wherein the first set of operations includes:
generating OOS data characterizing a likelihood the most recently added anchor item will be out of stock in a future time interval, based on store data associated with the most recently added anchor item.

10. The system of claim 1, wherein the first set of data is further based on historical substitution acceptance data.

11. The system of claim 10, wherein the historical substitution acceptance data includes historical substitution acceptance data for each of the plurality of users and an average of the historical substitution acceptance data of each anchor item added to an electronic cart.

12. A computer-implemented method comprising:
during a current browser session, obtaining, by a processor and from a first computing device of a user of a plurality of users, add-to-cart data characterizing a set of anchor items and an indication of a most recently added anchor item;
obtaining, by the processor and from a database, (i) user data associated with the user of the first computing device, (ii) transaction data associated with the user of the first computing device, and (iii) substitution data associated with the most recently added anchor item;
based at least on the add-to-cart data obtained during the current browser session, the user data of the user and the transaction data of the user, implementing, by the processor, a first set of operations that generate a first set of data characterizing an importance of the most recently added anchor item to the user, wherein the first set of operations includes comparing attribute features of the most recently added anchor item to the attribute features of anchor items of previous add-to-cart events, wherein the attribute features comprise at least: item brand, item type, item description and item price;

based at least on the add-to-cart data, the user data of the user, and the substitution data of the most recently added anchor item, implementing, by the processor, a second set of operations that generate a second set of data characterizing a likelihood of an occurrence of a substitution rejection event associated with the user;

generating, by the processor, output data based on the first set of data and the second set of data; and implementing, by the processor, a set of notification operations based on the output data.

13. The computer-implemented method of claim 12, further comprising:

determining the output data is greater than a threshold value; and in response to determining the output data is greater than the threshold value, cause an application executing on the first computing device of the user to generate and present a notification.

14. The computer-implemented method of claim 13, wherein the substitution data associated with the most recently added anchor item characterizes one or more substitution items, and wherein the notification includes a graphical representation of each of the one or more substitution items, along with a selectable feature, that when engaged with, causes the application to generate replacement data indicating a selected one of the one or more substitution items.

15. The computer-implemented method of claim 12, wherein generating the output data includes combining the first set of data and the second set of data.

16. The computer-implemented method of claim 12, wherein the set of notification operations includes:

based on the user data, obtaining preference data characterizing one or more item substitution preferences associated with the most recently added anchor item; and generating substitution item notification data based in part on the preference data.

17. The computer-implemented method of claim 16, further comprising:

determining the output data is greater than a threshold value; and in response to determining the output data is greater than the threshold value, transmit the substitution item notification data to the first computing device of the user.

18. The computer-implemented method of claim 12, wherein the user data includes engagement data, transaction data, acceptance data and feedback data.

19. The computer-implemented method of claim 12, further comprising:

implementing a third set operations that generate OOS data characterizing a likelihood the most recently added anchor item will be out of stock in a future time interval.

20. A non-transitory computer readable medium storing instructions, that when executed by a processor, causes the processor to:

during a current browser session, obtain, from a first computing device of a user of a plurality of users, add-to-cart data characterizing a set of anchor items and an indication of a most recently added anchor item;

obtain, from a database, (i) user data associated with the user of the first computing device, (ii) transaction data associated with the user of the first computing device, and (iii) substitution data associated with the most recently added anchor item;

based at least on the add-to-cart data obtained during the current browser session, the user data of the user and the transaction data of the user, implement a first set of operations that generate a first set of data characterizing an importance of the most recently added anchor item to the user, wherein the first set of operations includes comparing attribute features of the most recently added anchor item to the attribute features of anchor items of previous add-to-cart events, wherein the attribute features comprise at least: item brand, item type, item description and item price;

based at least on the add-to-cart data, the user data of the user, and the substitution data of the most recently added anchor item, implement a second set of operations that generate a second set of data characterizing a likelihood of an occurrence of a substitution rejection event associated with the user;

generate output data based on the first set of data and the second set of data; and implement a set of notification operations based on the output data.

* * * * *